(12) United States Patent
Lincoln

(10) Patent No.: US 12,310,818 B2
(45) Date of Patent: **\*May 27, 2025**

(54) PROCESS FOR PREPARING A PATIENT'S JAW FOR A FULL ARCH TEETH REPLACEMENT

(71) Applicant: TruBridge Dental L.L.C., Bainbridge Island, WA (US)

(72) Inventor: Helena Soomer Lincoln, Bainbridge Island, WA (US)

(73) Assignee: TruBridge Dental L.L.C., Bainbridge Island, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/535,699

(22) Filed: Dec. 11, 2023

(65) Prior Publication Data

US 2024/0115364 A1    Apr. 11, 2024

Related U.S. Application Data

(62) Division of application No. 18/162,497, filed on Jan. 31, 2023.

(Continued)

(51) Int. Cl.
  *A61C 8/00*    (2006.01)
(52) U.S. Cl.
  CPC .......... *A61C 8/0077* (2013.01); *A61C 8/0095* (2013.01)
(58) Field of Classification Search
  CPC ....... A61C 3/14; A61C 8/0006; A61C 8/0036; A61C 8/0018; A61C 8/0077; A61C 8/095; A61C 8/0037; A61C 8/0095
  See application file for complete search history.

(56) References Cited

U.S. PATENT DOCUMENTS

| 5,725,376 A | 3/1998 | Poirier |
| 8,231,386 B2 | 7/2012 | Hertz |

(Continued)

FOREIGN PATENT DOCUMENTS

| EP | 3067012 A1 | 9/2016 |
| JP | 2017176486 A | 10/2017 |

OTHER PUBLICATIONS

Atcha, "3 Approaches to Placing Implants After Tooth Extractions", Aug. 6, 2021. Accessed via https://newteethchicagodentalimplants.com/3-approaches-to-placing-implants-after-tooth-extractions/ on Feb. 6, 2024 (Year: 2021).*

(Continued)

*Primary Examiner* — Edward Moran
(74) *Attorney, Agent, or Firm* — Christenen O'connor Johnson Kindness PLLC

(57) ABSTRACT

A process for preparing one of a patient's upper and lower jaw for a full arch teeth replacement may include extracting every tooth in a patient's arch to define a corresponding number of post-extraction root sockets, wherein each tooth is extracted atraumatically to substantially maintain the patient's original alveolar bone and original keratinized gingiva, waiting a period of time to allow for tissue healing and substantial osteoblast/osteoclasts interaction and remodeling such that newly ossifying bone fills space in each of the post-extraction root sockets, installing a plurality of socket-sized implants less than the number of post-extraction root sockets into corresponding post-extraction root sockets, and allowing for osseointegration of each of the socket-sized implants into the newly ossifying bone of the corresponding post-extraction root sockets.

15 Claims, 35 Drawing Sheets

Related U.S. Application Data

(60) Provisional application No. 63/378,759, filed on Oct. 7, 2022.

(56) References Cited

U.S. PATENT DOCUMENTS

| | | | |
|---|---|---|---|
| 8,992,222 B2* | 3/2015 | Cottrell | A61C 8/0025 433/174 |
| 9,597,160 B1 | 3/2017 | Gregg, II | |
| 9,730,771 B2* | 8/2017 | Westover | A61C 8/0013 |
| 10,238,471 B2 | 3/2019 | Chan | |
| 2003/0232308 A1 | 12/2003 | Simmons, Jr. | |
| 2005/0037320 A1 | 2/2005 | Poirier | |
| 2006/0141419 A1 | 6/2006 | Heo | |
| 2007/0042315 A1 | 2/2007 | Boutossov | |
| 2010/0304332 A1 | 12/2010 | Benzon | |
| 2010/0304335 A1 | 12/2010 | Garcia Saban et al. | |
| 2012/0251974 A1 | 10/2012 | Katz | |
| 2014/0038134 A1 | 2/2014 | Nguyen | |
| 2014/0212843 A1 | 7/2014 | Chiu | |
| 2016/0166363 A1 | 6/2016 | Varsano | |
| 2021/0015584 A1 | 1/2021 | Gregg, II | |
| 2021/0128280 A1 | 5/2021 | Gregg, II | |
| 2021/0205051 A1 | 7/2021 | De Clerck | |
| 2021/0220093 A1 | 7/2021 | Sato | |
| 2022/0061966 A1 | 3/2022 | Haefele et al. | |

OTHER PUBLICATIONS

Dentist Channel Online, "Forceps in Dental Extraction—Classification, Working principle and Design". Sep. 25, 2021. Accessed via https://dentistchannel.online/forceps-in-dental-extraction-classification-working-principle-and-design/article?for=people on Feb. 6, 2024 (Year: 2021).*

Lopez-Jarana et al, "Thickness of the buccal bone wall and root angulation in the maxilla and mandible: an approach to cone beam computed tomography". Nov. 21, 2018. BMC Oral Health, Accessed at https://pubmed.ncbi.nlm.nih.gov/30463614/ on Feb. 6, 2024 (Year: 2018).*

Blanchet, E., et al., "An Image-Guided System Based on Custom Templates: Case Reports", Clinical Implant Dentistry and Related Research 6(1):40-47, Oct. 2006.

International Search Report and Written Opinion mailed Jan. 30, 2024, issued in corresponding International Patent Application No. PCT/US2023/076007, filed Oct. 4, 2023, 22 pages.

Kaufman, Z., and K.S. Parenhos, "Digitally Designed Ovate Pontic as a Predictable Procedure to Improve Accuracy, Hygiene, Esthetics", Compendium of Continuing Education in Dentistry, 43(4):226-230, Apr. 2022.

Lopez-Jarana, P., et al. ,"Thickness of the Buccal Bone Wall and Root Angulation in the Maxilla and Mandible: an Approach to Cone Beam Computed Tomography," BMC Oral Health 18(1):194, Nov. 2018, 9 pages.

Pozzi, A., et al., "The Implant Biologic Pontic Designed Interface: Description of the Technique and Cone-Beam Computed Tomography Evaluation", Clinical Implant Dentistry and Related Research, vol. 17, Supplement 2, pp. e711-e720, Mar. 2015.

Pozzi, A., et al., "Clinical and Radiological Outcomes of Two Implants with Different Prosthetic Interfaces and Neck Configurations: Randomized, Controlled, Split-Mouth Clinical Trial," Clinical Implant Dentistry and Related Research 16(1):96-106, Feb. 2014.

Pozzi, A., et al., "Clinical Reliability of CAD/CAM Cross-Arch Zirconia Bridges on Immediately Loaded Implants Placed With Computer-Assisted/Template-Guided Surgery: A Retrospective Study With a Follow-Up Between 3 and 5 Years", Clinical Implant Dentistry and Related Research, vol. 17, Supplement 1, pp. e86-e96, Jan. 2015.

Pozzi, A., et al., "Monolithic Lithium Disilicate Full-Contour Crowns Bonded on CAD/CAM Zirconia Complete-Arch Implant Bridges With 3 to 5 Years of Follow-Up", Journal of Oral Implantology vol. XLI(4), pp. 450-458, Aug. 2015.

Bhardwaj Dental Clinic, How Does Laser Tooth Extraction Work, https:bhardwajdentalclinic.com/2021/12/how-does-laser-tooth-extraction-work/ (Dec. 3, 2021) (Year: 2021).

Office Action for U.S. Appl. No. 18/535,800, filed Dec. 11, 2023, mailed on Apr. 19, 2024. 30 pages.

Office Action for U.S. Appl. No. 18/162,497, filed Jan. 31, 2023, mailed on Apr. 26, 2024. 26 pages.

* cited by examiner

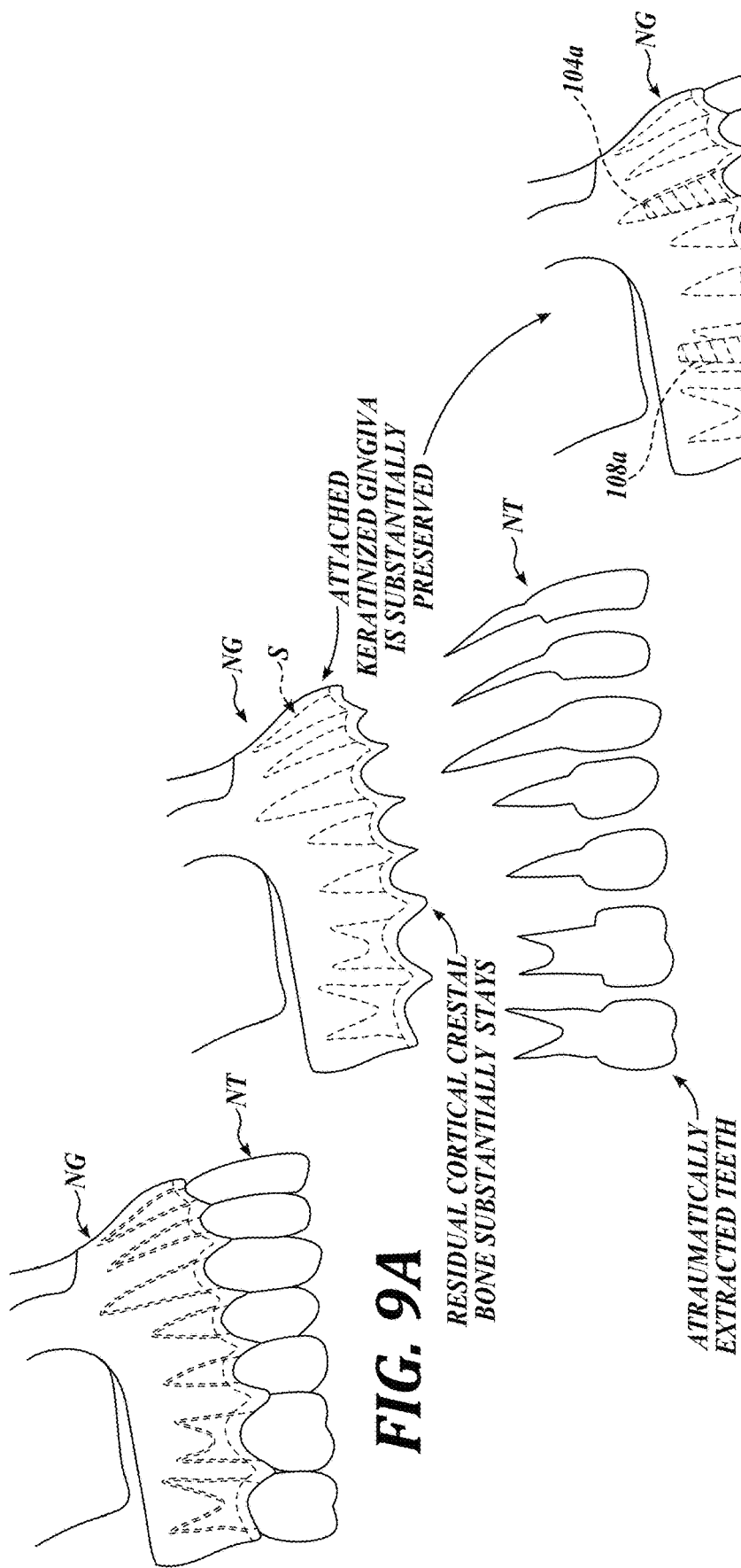

CROSS-SECTIONAL VIEW SHOWING ABUTMENT HOLE SHAPE

ATRAUMATIC EXTRACTIONS

IMPLANT PLACEMENT INTO FORMER TEETH SOCKETS

BI-CORTICAL ANCORAGE

APEX OF IMPLANT ATTACHED FIRMLY INTO THE CORTEX OF THE ALVEOLAR BONE

ABUTMENTS AND PLACING BRIDGE

PROCESS FOR PREPARING A PATIENT'S JAW FOR A FULL ARCH TEETH REPLACEMENT

CROSS-REFERENCES TO RELATED APPLICATIONS

This application is a division of U.S. patent application Ser. No. 18/162,497, filed Jan. 31, 2023, which claims the benefit of U.S. Provisional Patent Application No. 63/378,759, filed Oct. 7, 2022, the disclosures of both of which are expressly incorporated herein by reference in their entirety.

TECHNICAL FIELD

The present disclosure relates to a process for preparing one of a patient's upper and lower jaw for a full arch teeth replacement with a teeth-only, gingiva free dental restoration device.

SUMMARY

In some aspects, the techniques described herein relate to a process for preparing one of a patient's upper and lower jaw for a full arch teeth replacement, including: extracting every tooth in a patient's arch to define a corresponding number of post-extraction root sockets, wherein each tooth is extracted atraumatically to substantially maintain the patient's original alveolar bone and original keratinized gingiva; waiting a period of time to allow for tissue healing and substantial osteoblast/osteoclasts interaction and remodeling such that newly ossifying bone fills space in each of the post-extraction root sockets; installing a plurality of socket-sized implants less than the number of post-extraction root sockets into corresponding post-extraction root sockets; and allowing for osseointegration of each of the socket-sized implants into the newly ossifying bone of the corresponding post-extraction root sockets.

In some aspects, the techniques described herein relate to a process for preparing one of a patient's upper and lower jaw for a full arch teeth replacement with an artificial gingiva-free dental restoration device having a body with a gingival side and an occlusal/incisal side opposite the gingival side and a plurality of integrally formed tooth portions, the process including: extracting every tooth in a patient's arch to define a corresponding number of post-extraction root sockets, wherein each tooth is extracted atraumatically to substantially maintain the patient's original alveolar bone and original keratinized gingiva; waiting a period of time to allow for keratinized gingiva tissue healing and substantial osteoblast/osteoclasts interaction and remodeling such that newly ossifying bone fills space in each of the post-extraction root sockets; installing a plurality of socket-sized implants less than the number of post-extraction root sockets into corresponding post-extraction root sockets; and allowing for osseointegration of each of the socket-sized implants into the newly ossifying bone of the corresponding post-extraction root sockets, wherein ovate pontic portions defined on the gingival side of the body on each tooth portion of the dental restoration device are sealable against an entire circumference of keratinized gingiva surrounding corresponding post-extraction root sockets.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIGS. 9A-9C depict an overview of a pre-prosthetic ridge preservation process and a dental restoration device (or simply a "dental bridge") formed in accordance with examples of the disclosure will first be described.

DETAILED DESCRIPTION

Figure 1:
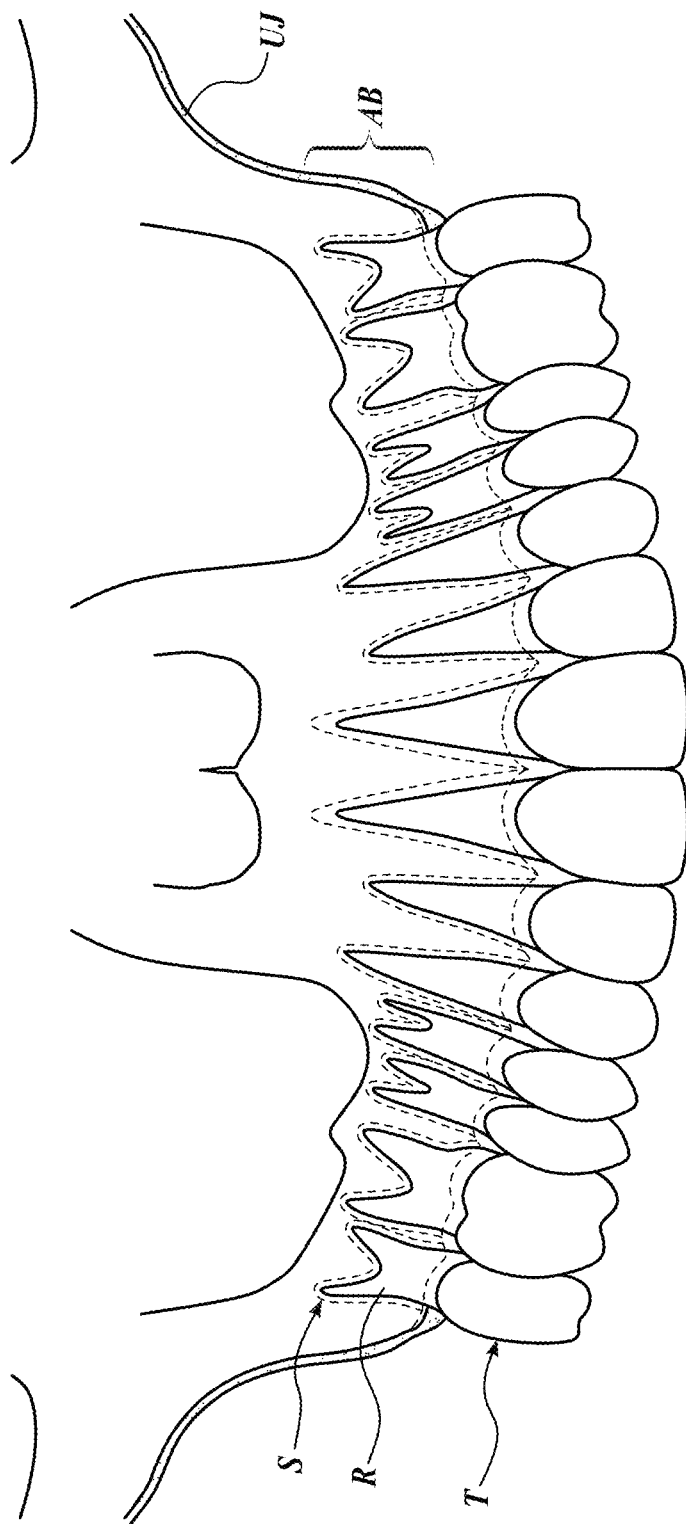
FIG. 1 depicts an image of an exemplary human upper jaw showing fourteen (14) natural teeth each having roots secured within corresponding teeth sockets defined in an upper jawbone.

FIG. 1 depicts an image of an exemplary human upper jaw showing fourteen (14) natural teeth T each having roots R secured within corresponding teeth sockets S defined in an upper jawbone UJ. The portion of the upper jawbone UJ defining the teeth sockets S is called the alveolar bone AB.

Tooth decay can necessitate removal of a diseased part of the tooth and restoration of the same, which is typically an ongoing process. Small restorations (e.g., fillings) can become larger restorations (e.g., crowns or bridges) as the tooth ages. Ultimately, there may be a time when a tooth becomes non-restorable (also sometimes called "non-retainable" or "terminal"). For instance, the tooth may be cracked, a tooth may have decay on the root surface, a tooth may have poor bone support, etc. In such an instance, a dental professional may determine that it is better for the health of the remaining dentition to remove such teeth. In some instances, all or substantially all of the teeth of the upper and/or lower jaw may necessitate replacement, and a full mouth (e.g., 10, 12, or 14-teeth) teeth replacement is recommended. There are various modalities to replace teeth.

For instance, a dental implant(s) may be secured within a jaw of a patient, and a single tooth, a bridge of teeth, or implant retained dentures are then secured to the dental implant. More specifically, a dental implant, which is a small titanium screw, is positioned into the jawbone to support either a single tooth, a bridge of teeth, or implant retained dentures. In other words, the titanium implant forms the foundation by which the replacement teeth are attached.

For a conventional dental implant procedure, a full arch rehabilitation requires six- to eight (6-8) implants to support a full fixed bridge or implant retained dentures. A limitation of the conventional full arch teeth replacement method arises when screwing the posterior implants into areas of reduced bone density.

An All On 4™ or "Malo bridge" technique as well as other similar prior art techniques has become widely acknowledged as the superior treatment option for a full-arch teeth replacement because only four implants are needed to provide support for the full arch, and the results are instant. Consumers were convinced that this form of treatment for "getting an instant, beautiful smile" was the "clear choice" over other treatment options. Aspects of this prior art treatment, such as the All On 4™ technique, including the full-arch teeth replacement prosthesis used for the technique is shown in FIGS. 2-8.

Figure 2:
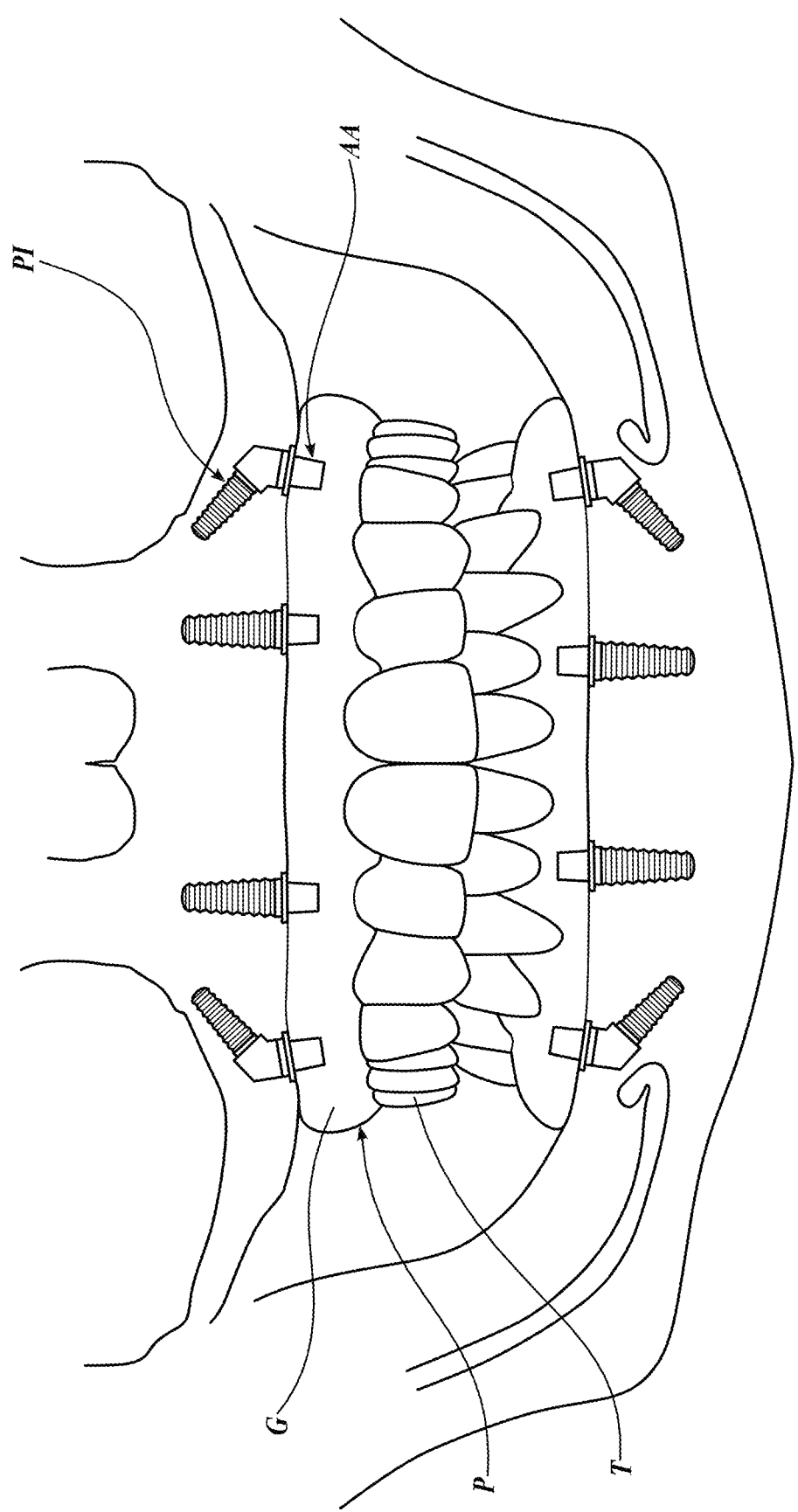
FIG. 2 depicts a front view of an exemplary prior art dental restoration technique, including a full-arch teeth replacement prosthesis having artificial gingiva and teeth secured to angulated implants with angulated abutments.
Figure 3:
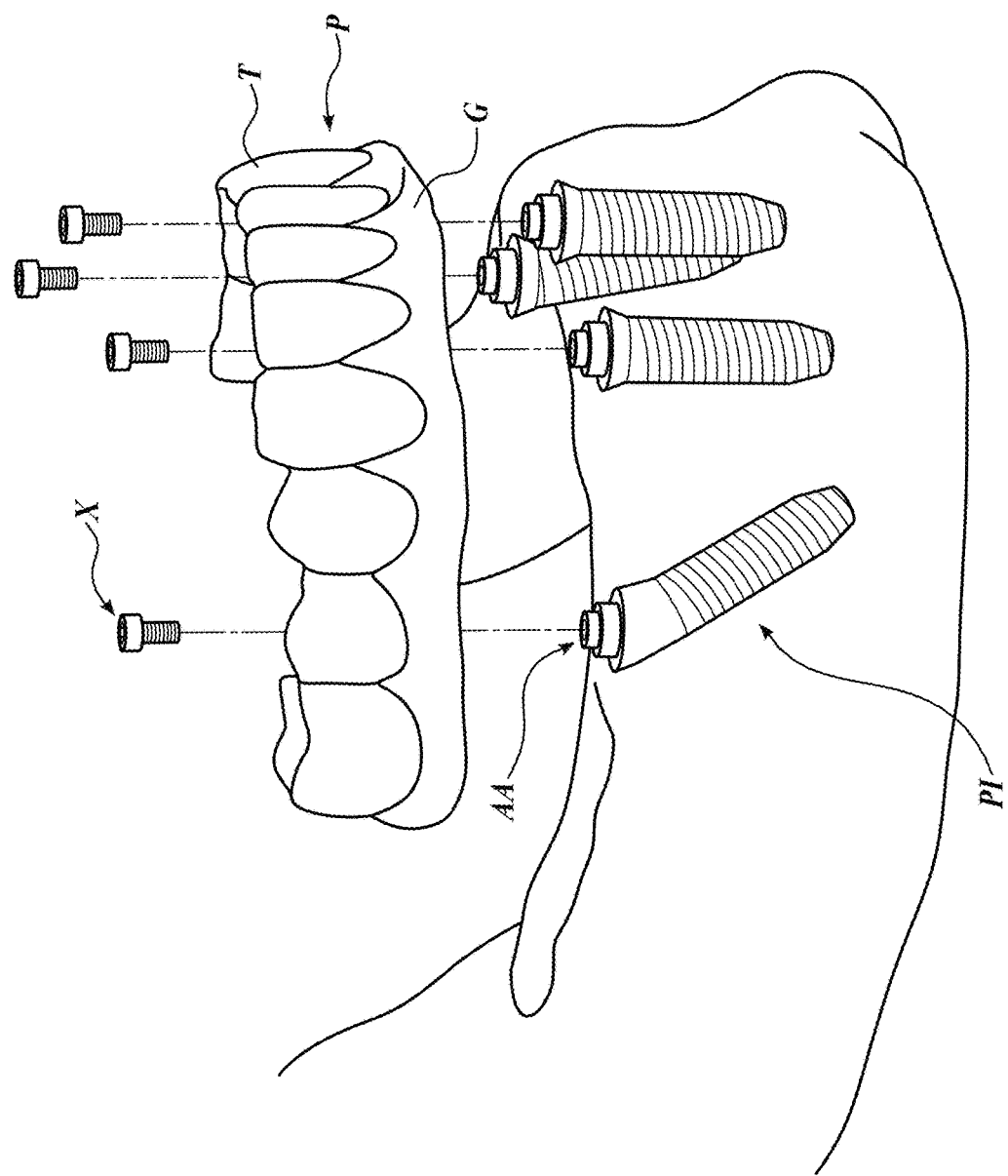
FIG. 3 depicts an isometric view of the prior art dental restoration technique of FIG. 2.

Referring specifically to FIGS. 2 and 3, with the All On 4™ dental implant procedure, the posterior implants PI are tilted 45° towards the rear of the mouth and placed into the anterior maxilla, a region of the jaw with higher bone density. More specifically, long posterior implants PI are inserted at 45-degree angles into the anterior maxilla and mandible, and angled abutments AA (such as multi-unit angulated abutments) are used at the distal end of the posterior implants PI to attach a prior art prosthetic P to the upper and lower jaw. The angled abutments AA are generally at a 45-degree angle relative to the longitudinal axis of the posterior implants PI such that screws X may be inserted transversely through the prosthetic P into the abutment opening.

Compared to other implant methods, the All On 4 technique doesn't require the same density of bone in order to secure the implant. Rather, the introduction of the 45° angulated implant meant that bone-deficient areas of the jaw could be avoided.

For any dental implant procedure, a pre-prosthetic surgery is likely necessary to prepare a patient's mouth before the placement of a prosthesis. For instance, a pre-prosthetic surgery protocol may include smoothing out, reshaping, and/or partially removing the bone surrounding the teeth.

Figure 4A:
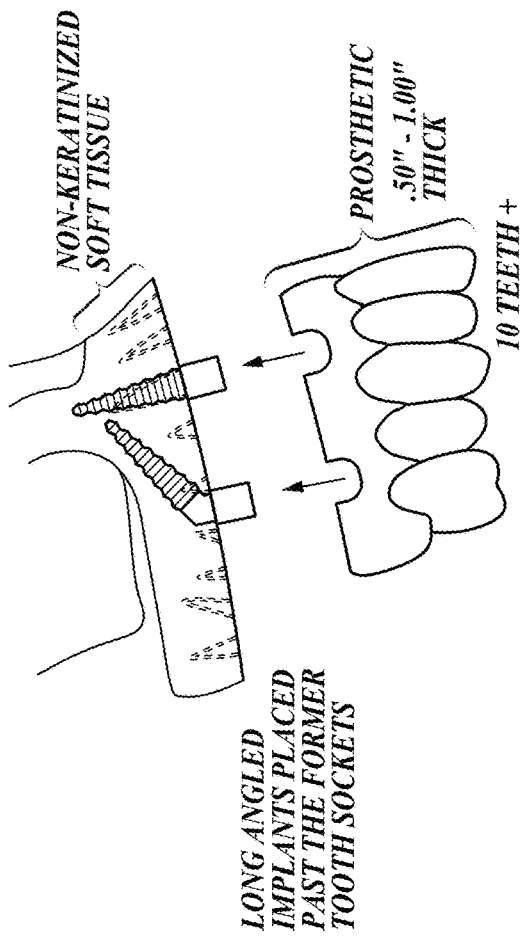
FIGS. 4A-4C depict images providing an overview of the prior art dental restoration technique of FIG. 2.
Figure 4B:
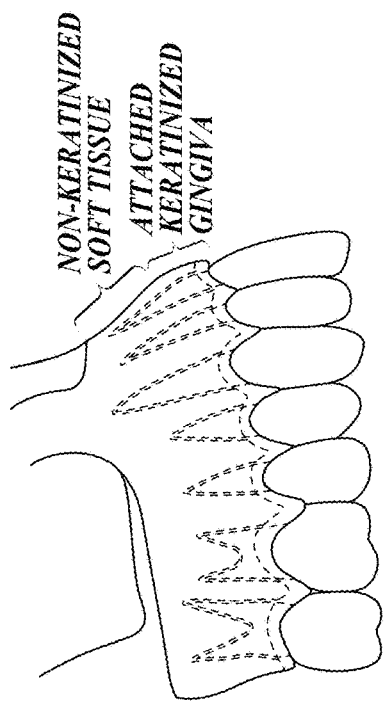
Figure 4C:
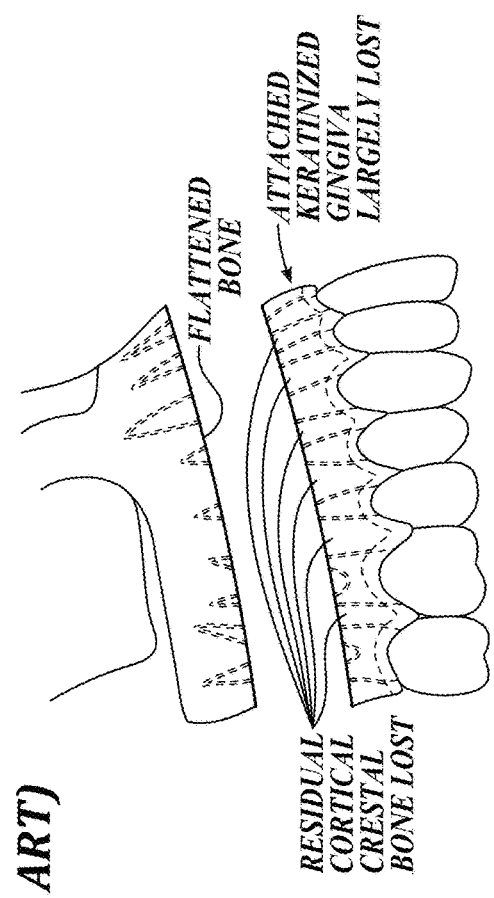
Figure 5:
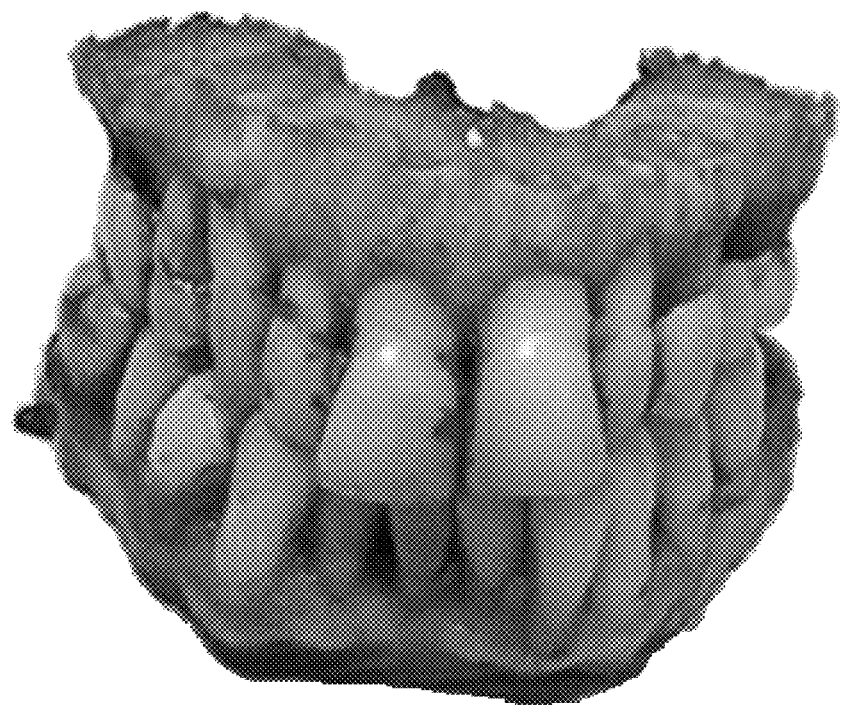
FIGS. 5 and 6 depict photograph images of a patient's teeth and jaw for the upper and lower jaw, respectively, removed using the prior art dental restoration technique of FIG. 2.
Figure 6:
Figure 7:
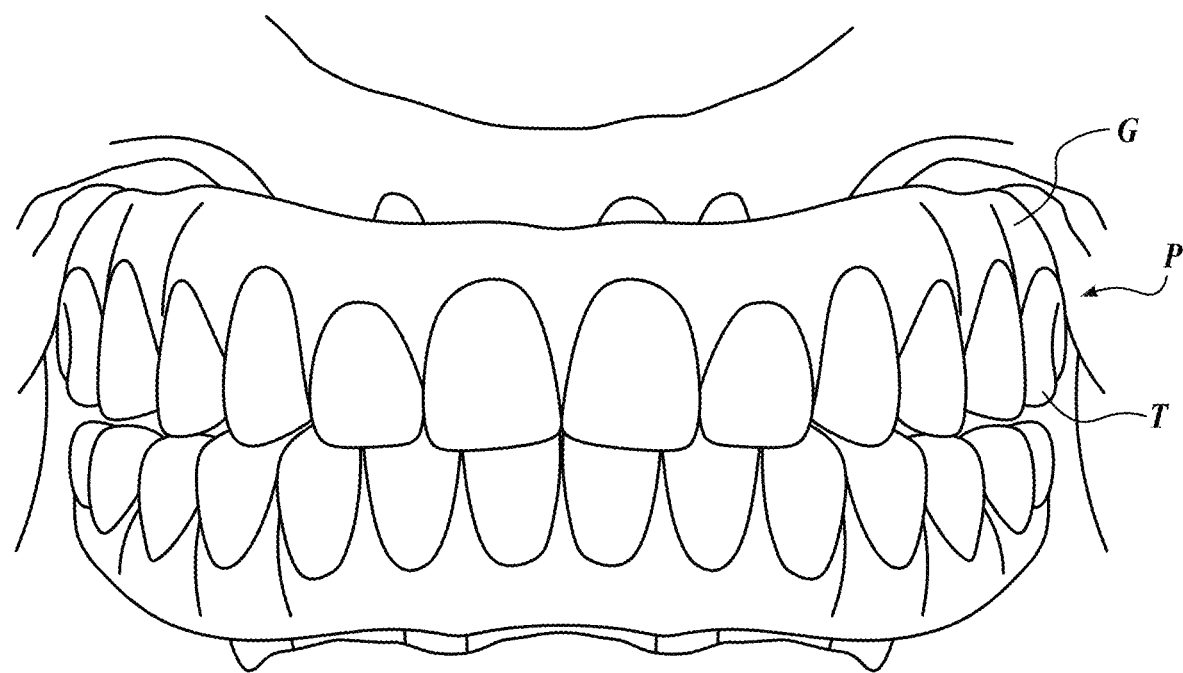
FIG. 7 depicts a photograph image of full-arch teeth replacement prostheses having artificial gingiva and teeth secured to upper and lower jaws of patient.

Referring to FIGS. 4-6, the All On 4™ pre-prosthetic surgery protocol includes removing about one inch of bone (along the height of the jaw) from the maxillary and/or mandibular arches, which includes the alveolar bone that houses the teeth and all of the keratinized gingival tissue KG (i.e., the attached, sturdy tissue that covers the alveolar bone and supports the teeth). Such a dramatic pre-prosthetic surgery protocol used for the All On 4™ technique is quick compared to smoothing out, reshaping, and/or partially removing the bone surrounding the teeth to accommodate individual teeth, a conventional bridge, etc. The rehabilitation process for the All On 4™ pre-prosthetic surgery is also considerably shorter because the bone does not need to heal to support the new prosthetic. Further, because fewer implant fixtures are used, there is more flexibility to design and fit the optimum replacement teeth compared to conventional full arch teeth replacement or the like. Accordingly, many patients have opted for this "new teeth in a day" procedure.

As noted above, the All On 4™ pre-prosthetic surgery protocol includes removing one inch of bone from maxillary and/or mandibular arches, including the alveolar bone that houses the teeth and the keratinized gingival tissue. Accordingly, the prior art prosthetic P used for the All On 4™ dental implant procedure, which is shown in FIGS. 2-4 and 7, must replace the missing bone and tissue. In that regard, the All On 4™ prior art prosthetic P includes an artificial gum portion AG and artificial teeth AT extending from the gum portion AG. When removing the bone, the maxillary and/or mandibular arches are flattened such that the artificial gum portion AG may be universally designed to generally fit in any patient's mouth. Moreover, a flattened prosthesis interface may easily seat against the jaw for securing to the implant abutments.

The prosthetic P is purposefully made tall (about one-half to one inch tall defined by the height of teeth+the height of the artificial gingiva) and thick to prevent breakage during its use, to hide the transition line from artificial gingiva to patient's natural gingiva, and to provide instant teeth secured to the just-placed implants without a period of healing. However, when so tall and thick, the prosthetic P can include only ten (versus twelve or fourteen) teeth, i.e., the prosthetic P does not usually include the second bicuspid and second molar. If the prosthetic P included all fourteen functional teeth, the prosthetic P would be so large that the patient could not open sufficiently wide to allow for the prosthetic P to be screwed into their jaw.

The design of the prosthetic P includes other drawbacks. For instance, the prosthetic P does not seat with the patient's gum line in a way that teeth naturally do, which makes it very difficult to clean underneath the prosthetic, often leading to chronic tissue irritation and inflammation. Moreover, a tall and thick prosthetic such as the All On 4™ prosthetic P causes speech difficulties, such as in the form of lisping from the gap that forms between the prosthetic and the patient's natural gums. Further, despite being tall and thick, breakage still frequently occurs.

As a further issue, the long-angled implants are placed in the jawbone past the former tooth sockets, into the native bone that is naturally not meant to house roots or implants. Moreover, implants that are at sharp angles and abrupt transitions like the 45-degree angle implants used with the All On 4™ procedure are un-natural to the body and often cause soft tissue irritation and inflammation. Moreover, if the underlying implants fail, the patient cannot later decide to use a different type of prosthetic because the bone and gum has already been permanently removed.

Accordingly, it can be appreciated that the quick teeth replacement fix provided by the All On 4™ procedure or similar procedures has major drawbacks.

Systems and methods disclosed herein are directed to a unique dental restoration device and method that can support a full mouth teeth replacement (e.g., 10 to 14 teeth) while using a minimal number of non-angulated implants (e.g., four non-angulated implants) and while preserving a patient's bone and natural gum line to provide a natural teeth feel and look. In that regard, the exemplary dental restoration device and method described herein avoids excessive bone removal and a large prosthetic that leads to issues with speech and cleanability. Rather, using the systems and methods described herein, a dental restoration device for a full-mouth dental replacement may be free of artificial gingiva and may instead include only artificial teeth that seat against a patient's natural gum line.

Examples of a dental restoration device described herein are generally configured as a dental bridge and will generally hereinafter be referenced as such. However, it should be noted that the dental restoration device may instead be considered to be any other suitable dental restoration device, such as an implant-based denture, a prosthetic, etc. Accordingly, the use of the term "bridge" should not be seen as limiting.

A dental restoration device or bridge formed in accordance with examples of the disclosure can be used after pre-prosthetic ridge preservation process to prepare a patient's mouth, which includes performing atraumatic dental extractions and preserving the original tooth sockets. The dental restoration device may then be secured to the upper or lower jaw using socket sized, non-angulated implants.

General Description of Dental Bridge and Ridge Preservation Process

An overview of the dental restoration device and the pre-prosthetic ridge preservation process formed in accordance with examples of the disclosure will first be described with respect to FIGS. 8 and 9, respectively.

Figure 8:
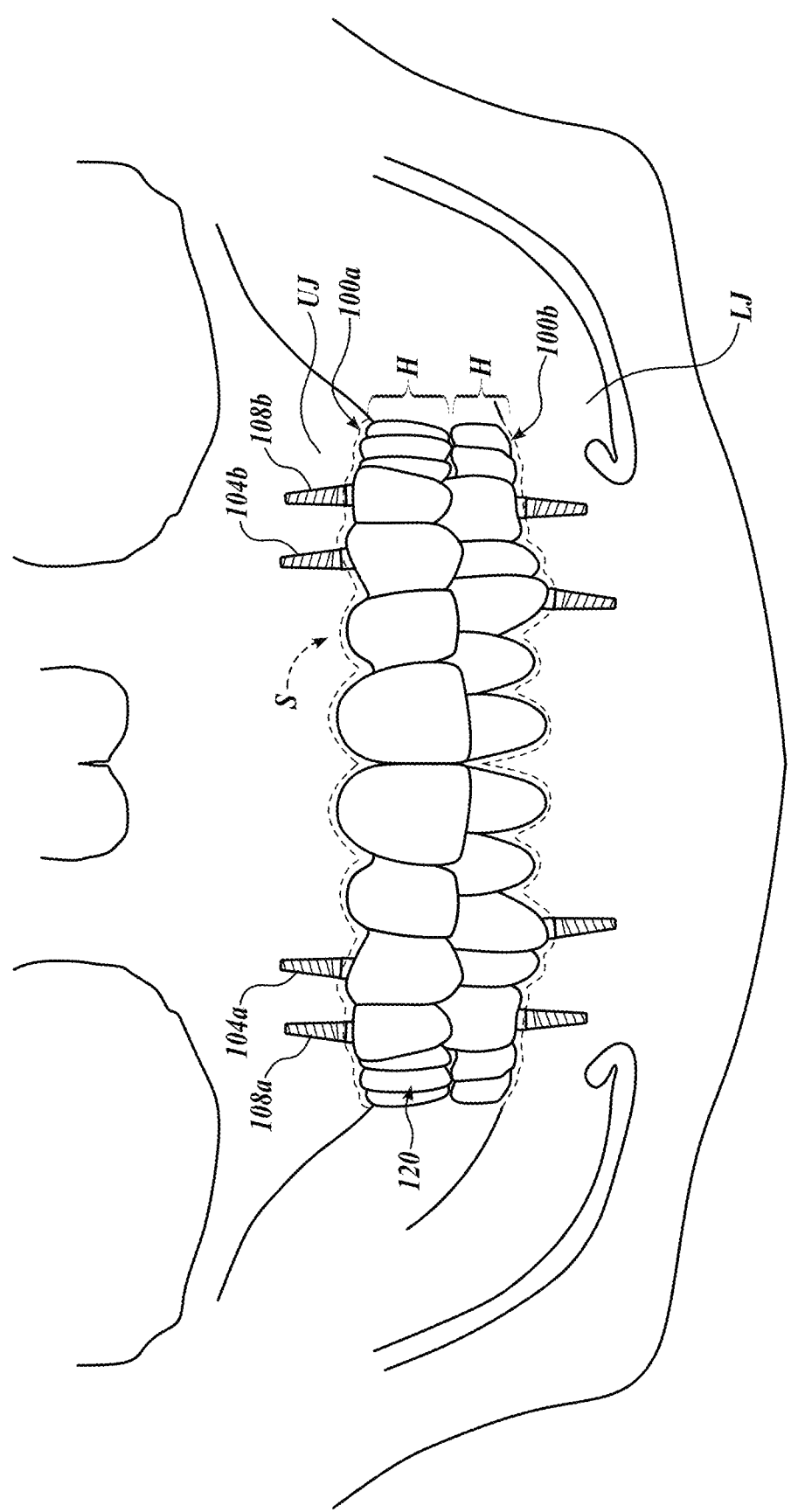
FIG. 8 depicts a front view of examples of first and second dental restoration devices secured to upper and lower jaws, respectively, of a patient, using the systems and described herein.

Referring first to FIG. 8, exemplary aspects of a dental restoration device are shown. More particularly, a first dental restoration device is shown as a first dental bridge 100a for an upper jaw and a second dental restoration device is shown as second dental bridge 100b for a lower jaw. The first and second dental bridges 100a and 100b may hereinafter be simply referred to as "dental bridge 100" for simplicity.

The dental bridge 100 is generally a full-arch teeth replacement device for an upper or lower jaw that is without artificial gingiva (e.g., includes only artificial teeth), that can seat against a patient's natural gum line, and that can attach to socket-based implants. The dental bridge 100 is denoted as "full arch" because it is generally designed to include the same number of teeth as the patient's original arch, such as fourteen teeth, twelve teeth, or ten teeth. In some instances, the dental bridge 100 may have less teeth than the original arch if needed for dental/medical reasons. For instance, if a patient's original arch included significant crowding, the bridge may be designed to include fewer teeth to better accommodate the size of the patient's jaw, for instance. In any case, the dental bridge 100 is considered a full arch bridge device in that fewer teeth are not needed for the bridge to fit within a patient's mouth, as in the prior art method (see FIG. 4C where the prosthetic includes only ten teeth, whereas the patient originally had fourteen teeth, as shown in FIG. 4A).

The dental bridge 100 includes a light-weight body made from zirconia or a similarly strong, non-porous (e.g., non-staining), hygienic material to provide the strength of natural teeth. The body extends between a gingival side and an occlusal/incisal side and includes a plurality of teeth portions each having a tooth axis extending between the gingival side and the occlusal/incisal side that is offset from vertical.

The dental bridge 100 defines an ovate bridge/gingival interface for each tooth portion on the gingival side of the body. The ovate design on the gingival side of the body enables the bridge to seat against a patient's upper or lower gums, which are left intact during the pre-prosthetic ridge preservation process. In that regard, the dental bridge 100 is custom-made to fit the unique shape and contours of the patient's gum line defined by the preserved tooth sockets, giving the replacement teeth a natural look and feel. Moreover, when seated against a patient's gums, the height H of the body of the dental bridge 100 is about one-eight inch in height (⅛"), compared to the prosthetic P shown in FIGS. 2-4 that is about one-half to one inch in height (½"-1").

The dental bridge 100 is secured to the upper or lower jaw UJ or LJ with the use of tooth-sized, non-angulated implants placed into tooth sockets S that are preserved, for instance, using the pre-prosthetic ridge preservation process. Tooth or socket sized implants are placed into a necessary number of sockets, such as four sockets for a full mouth replacement. In the example shown in FIG. 8, for the upper jaw UJ on a first side, an anterior tooth-sized implant 104a is secured in the canine tooth socket, and a posterior tooth-sized implant 108a is secured in the first molar tooth socket. Similarly, an anterior tooth-sized implant 104b is secured in the canine tooth socket on a second side of the upper jaw UJ, and a posterior tooth-sized implant 108b is secured in the first molar tooth socket on the second side of the upper jaw UJ. A similar implant arrangement may be used for the lower jaw LJ (not separately labeled).

Tooth-sized (non-angulated) implants can be used in the posterior region of the jaw (e.g., the first molar tooth socket) because the implants can be secured in the alveolar bone of the patient, which is substantially preserved during the pre-prosthetic ridge preservation process or a similar process. In other words, angulated implants, as used in the prior art method, are not necessary because sufficient posterior jawbone density is preserved (i.e., it is not removed during the pre-prosthetic surgery as in the prior art method).

As noted above, anterior and posterior non-angulated tooth-sized implants 104a, 104b and 108a, 108b may be used to secure the dental bridge 100 to the upper or lower jaw UJ or LJ. In that regard, the body of the dental bridge 100 includes a corresponding number of abutment holes extending through respective teeth portions of the body from the gingival side to the occlusal/incisal side. Each of the abutment holes is configured to receive a corresponding abutment for mating with an implant. In that regard, each of the abutment holes includes a longitudinal axis that is substantially coaxially aligned with the tooth axis of the respective teeth portion of the bridge 100, which is substantially coaxially aligned with the implant axis. As will become appreciated from the description below, alignment of the abutment holes with the teeth axis allows for the bridge 100 to be secured to corresponding non-angulated implants that are placed in the preserved tooth sockets.

Referring now briefly to FIG. 9, the pre-prosthetic ridge preservation process generally includes performing atraumatic dental extractions of each tooth to prepare the patient's jaw for mating with the dental bridge 100. The dental extractions are done atraumatically in a manner that substantially preserves the bone and tissue defining the patient's natural tooth sockets. In other words, the pre-prosthetic ridge preservation process substantially preserves the patient's bone and gum line for seating against the dental bridge 100 in the manner generally described above.

Exemplary detailed aspects of both the dental bridge and the pre-prosthetic ridge preservation process will now be described.

Pre-Prosthetic Ridge Preservation Process

The pre-prosthetic ridge preservation process will first be described in greater detail. Generally, the pre-prosthetic ridge preservation process includes performing atraumatic extractions of all the teeth of the upper and/or lower jaw and placing implants into sockets preserved using the pre-prosthetic ridge preservation process described above, or another process that produces similar results.

Atraumatic Extractions

Exemplary aspects of steps for performing atraumatic extractions of all the teeth of the upper and/or lower jaw using the pre-prosthetic ridge preservation process will first be described with reference to FIGS. 8-15. As noted above, the pre-prosthetic ridge preservation process is used to remove the patient's teeth while substantially preserving the patient's bone and gum line to provide the foundation against which the dental bridge may be placed.

Regarding the patient's bone, each tooth is extracted atraumatically to preserve the alveolar bone substantially in its entirety. The alveolar bone, which houses the teeth roots, includes an outer cortex that encloses an inner medulla. The outer cortex is generally a hard, thick, outer bone, and the medulla is a soft, spongy, inner bone. The outer cortex defines a dental inter-radicular ridge, and when extracting the teeth atraumatically using suitable techniques such as those described herein, substantially the full height and width of the patient's original dental inter-radicular ridge is preserved (see FIGS. 9, 14, and 15). In other words, the bone is not substantially clipped or cut down during extraction (as in the prior art methods), and in most instances, no bone is removed. Rather, the integrity of the alveolar bone, including the original dental inter-radicular ridge and the interdental and interseptal bone, is substantially maintained in its entirety. Further, all four walls of the post-extraction root socket (e.g., the 360-degree enclosed wall of the socket) are substantially left intact.

Regarding the patient's gum line, the atraumatic extraction of the tooth also preserves the keratinized gingiva that defines the naturally shaped gingival ridge. During extraction, the gingival cuff surrounding each tooth is gently elevated and substantially undisturbed during tooth extraction and in post-recovery healing. In other words, typically no flap is created, thereby preserving the interdental papilla.

Suitable techniques for extracting a tooth atraumatically to preserve the alveolar bone and the gingiva in accordance with exemplary aspects of the pre-prosthetic ridge preservation process will be described with particular reference to FIGS. 10-13. Generally, suitable techniques for extracting a tooth in accordance with examples herein include assessing each tooth for removal, elevating the gingival cuff surrounding the tooth, and gripping and moving the tooth with a suitable tool to pull the tooth out of the socket.

In an initial step, each tooth may be assessed to determine a patient's overall candidacy for teeth replacement and/or to determine any unique aspects of a tooth that may affect the technique used for tooth removal and/or the expected result of the tooth removal. For instance, an assessment of each tooth may be performed using a cone beam computer tomography scan ("CBCT scan"). The CBCT scan is used to analyze each tooth, including its root system and surrounding alveolar bone structure.

Figures 10A, 10B, 10C:
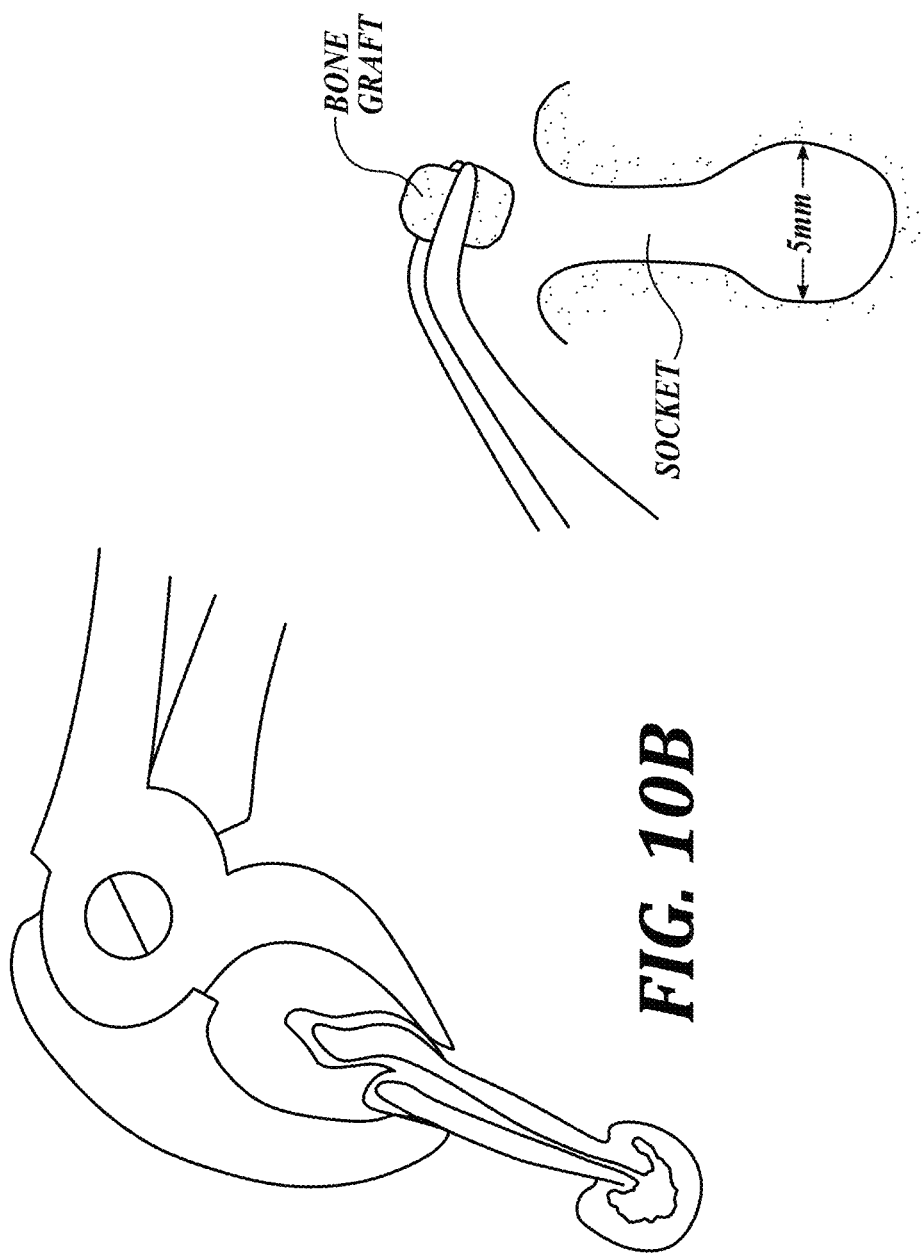
FIGS. 10A-10C depict a tooth having an abscess being removed, including any diseased tissue defining the abscess.

For instance, each tooth may be analyzed to determine if the tooth has a lesion at the apex of the root, for example, an abscess, as shown in FIG. 10A. Such a tooth may be designated as non-restorable and must be removed substantially in its entirety along with the lesion in the bone. FIG. 10B depicts a tooth having an abscess being removed, including any diseased tissue defining the abscess. In some instances, as shown in FIG. 10C, after the socket is cleaned, the defect area may be more than a certain size (e.g., more than 5 mm wide) and the socket may be augmented with a bone graft (e.g., bone graft putty).

Figure 11:
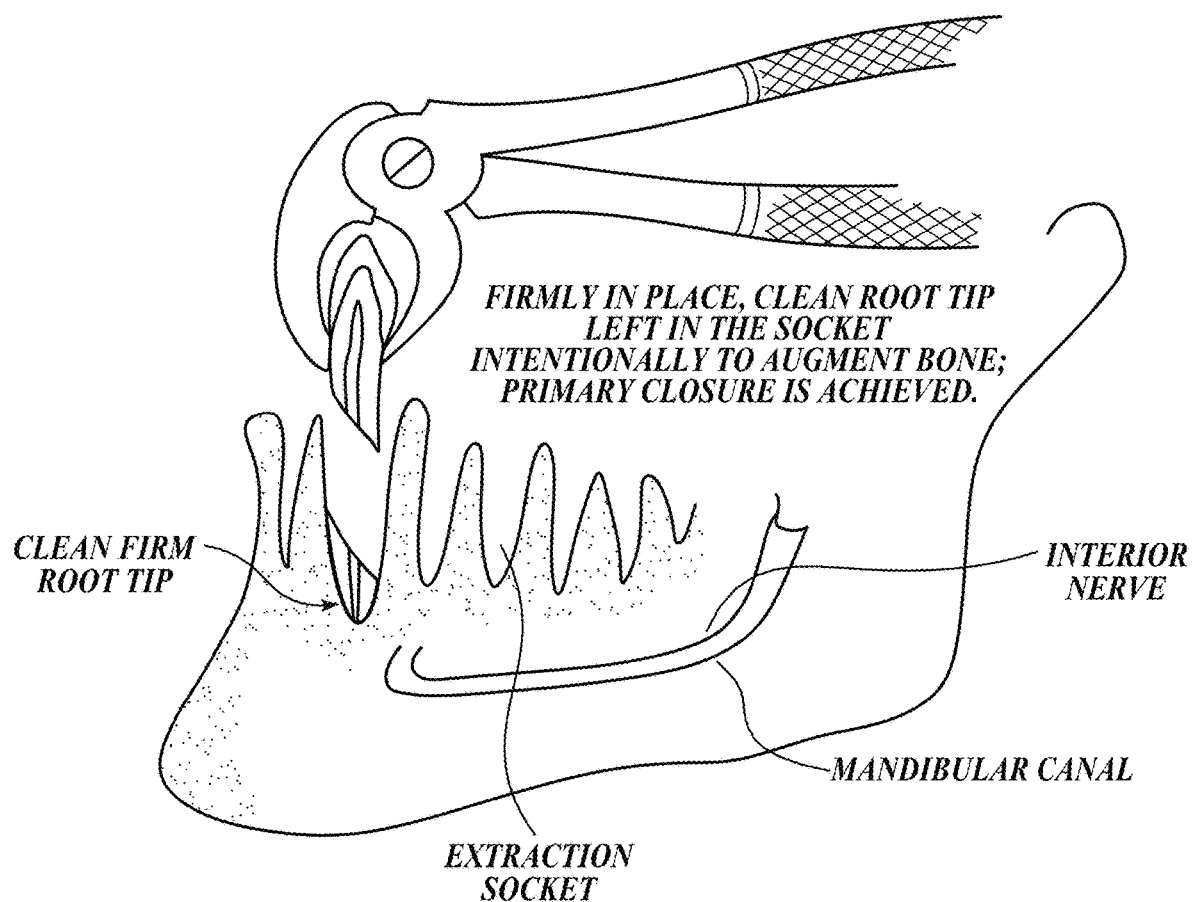
FIG. 11 depicts a tooth having a hooked root tip, wherein the tooth is being extracted and a portion of the root tip is left in the alveolar bone.

Other aspects of the teeth may also be assessed and noted. For instance, a tooth may or may not include a periapical lesion, but a tooth root may have a curve or angulation away from the longitudinal axis of the tooth (e.g., a "hook" in the end of the root). Such a curved or hooked root-tips of can be allowed to remain in the alveolar bone, such as if the root breaks during the extraction, as shown in FIG. 11. In such an instance, the firm root-tip intentionally left in the socket can be cleaned to augment the alveolar bone.

The strategy for each tooth extraction as well as the overall mouth replacement (e.g., whether it makes sense to perform a total mouth replacement) can be assessed in this preliminary step using a CBCT scan or similar. For instance, if a majority of the teeth are designated as non-restorable, the patient may be designated as a candidate for total teeth replacement.

Figure 12:
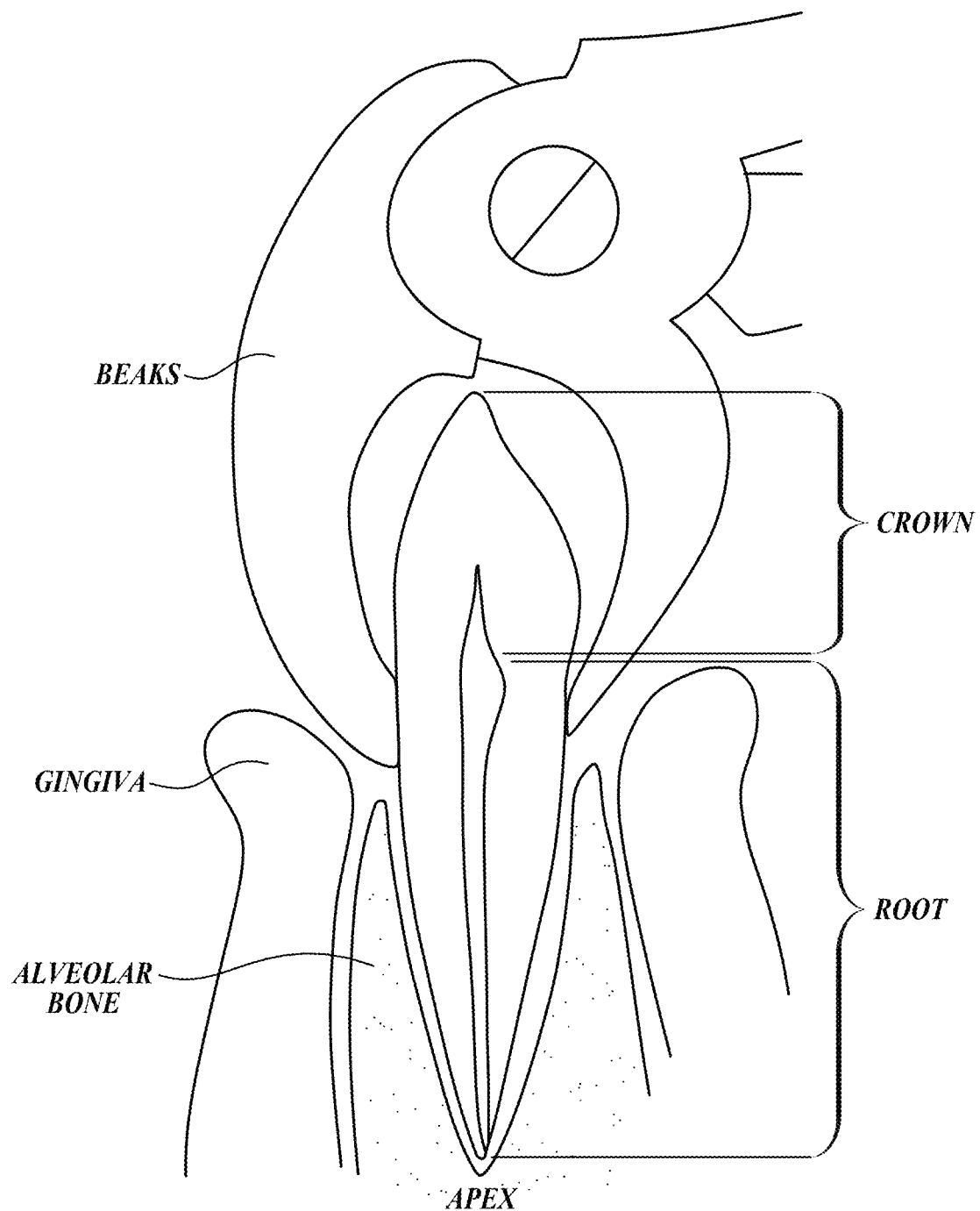
FIG. 12 depicts an image showing aspects of an atraumatic tooth extraction in accordance with exemplary aspects of the pre-prosthetic ridge preservation process of FIG. 9.

Referring to FIG. 12, after an (optional) assessment is performed, the pre-prosthetic ridge preservation process includes extracting teeth atraumatically. The atraumatic tooth extraction process may be performed without fully anesthetizing the patient. Instead, the patient's alveolar ridge (the teeth, gingiva, and alveolar bone) may simply be anesthetized.

The atraumatic tooth extraction process may include an initial step of gently relieving the gingival cuff around the tooth (such as by using Lucas's curette), e.g., using a flapless technique. In any event, care is taken to try to avoid laying a full thickness mucoperiosteal flap longer than about 2 mm around the tooth in the active quadrant. With the gingival cuff elevated around the tooth, the upper (coronal) quadrant of the root surface is exposed, and the beaks of forceps may be placed around the upper quadrant of the root surface (e.g., past the crown, not substantially touching the crown of the tooth).

With the beaks of the forceps around the upper quadrant of the root surface, as generally shown in FIG. 12, the atraumatic tooth extraction process may include applying force to the tooth in the socket, such as to loosen the tooth and eventually extract the tooth. For instance, the atraumatic tooth extraction process may include applying apical pressure and/or lateral pressure and/or an upwardly pulling force to the tooth in its socket.

Apical pressure and/or lateral pressure helps enlarge the tooth socket of the tooth because the tooth is denser than the alveolar bone; and therefore, pressure from the tooth's root applied to the alveolar bone in the socket pushes the alveolar bone away from the root (e.g., it condenses the alveolar bone surrounding the socket). As a result, the tooth socket expands. A suitable amount of pressure is applied to sufficiently enlarge the socket to allow for the tooth to loosen and for the tooth to be atraumatically extracted in accordance with the methods described herein.

Figure 13:
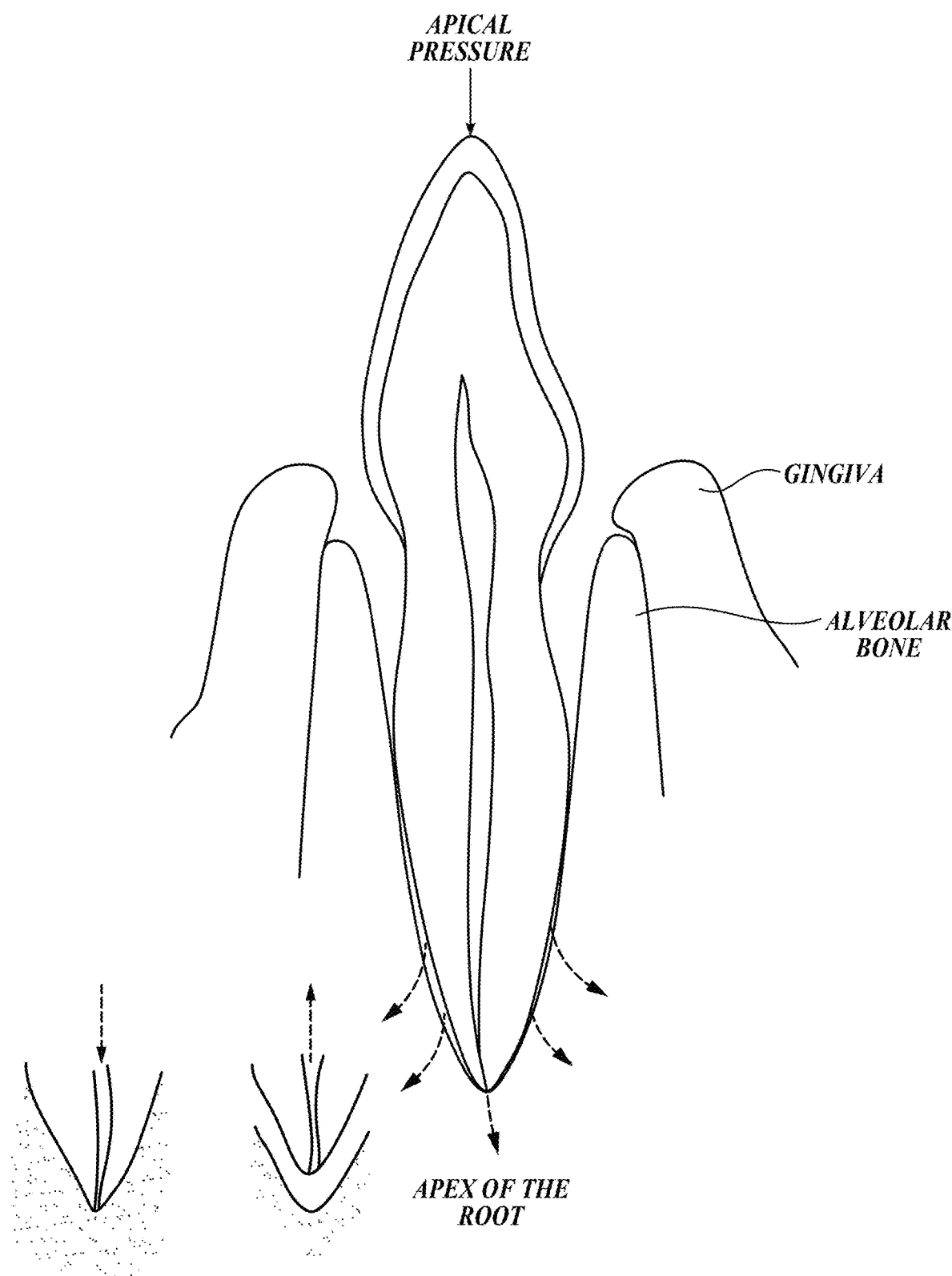
FIG. 13 depicts an image showing further aspects of an atraumatic tooth extraction in accordance with exemplary aspects of the pre-prosthetic ridge preservation process of FIG. 9.

For instance, referring to FIG. 13, the beaks of the forceps may be aligned substantially parallel to the longitudinal axis of the tooth (not shown), and apical pressure may be applied to the tooth (e.g., as if trying to move the tooth deeper down into its socket). More specifically, with the beaks of the forceps firmly holding the tooth (e.g., from the upper quadrant of the root), firm pressure may be applied to the tooth pressing it apically (upwards for upper teeth; downward for lower teeth). The apical pressure may be applied for a predetermined amount of time (e.g., for about 10 seconds), depending on the nature of the tooth, any pathologies of the tooth, the sensed movement of the tooth during application of apical pressure, etc.

Apical pressure helps enlarge the tooth socket at its apical tip. More specifically, pressure from the tooth's root applied to the alveolar bone at the apical tip pushes the alveolar bone away from the root (e.g., it condenses the apical part of the alveolar bone). After applying apical pressure, the tooth may be pulled upwardly and brought back to the starting position (e.g., substantially the original position of the tooth).

As noted above, lateral pressure and/or an upwardly pulling force may also be applied to loosen the tooth in its socket. For instance, when gripping the tooth near its root (e.g., past the crown) with beaks of forceps, as shown in FIG. 12, the tooth may be gently moved laterally in its socket, further expanding the socket in the alveolar bone. For instance, a "figure of eight" (or "FIG. 8") movement and/or a bucco-lingual movement can be used to further expand the socket in the alveolar bone, further loosening the tooth.

After a sufficient amount of lateral and/or apical pressure/movement is applied, the atraumatic tooth extraction process may further include pulling upwardly on the tooth either in isolation or when moving the tooth laterally in its socket. Extraction of the tooth is ultimately accomplished with at least some upward pulling movement/force.

As noted above with respect to FIG. 11, if a tooth breaks during extraction, and the tooth has a substantially disease-free root tip and sits firmly in the bone, the root-tip can remain in the alveolar bone substantially undisturbed, the socket can be irrigated with sterile saline, and primary closure can be performed for the extraction socket as needed in accordance with known methods, such as the method described in the article "Leaving a Root Behind on Purpose—Coronectomy", by Dr. Karl Koerner. It should be appreciated that in most instances, removal of the root-tip would require more surgery and destruction of alveolar bone, which is contrary to the intention of preserving the alveolar bone using the pre-prosthetic ridge preservation process described herein. However, as is normally the case, a dental professional will take necessary measures to ensure patient safety and overall success for restoration.

Figure 14A:
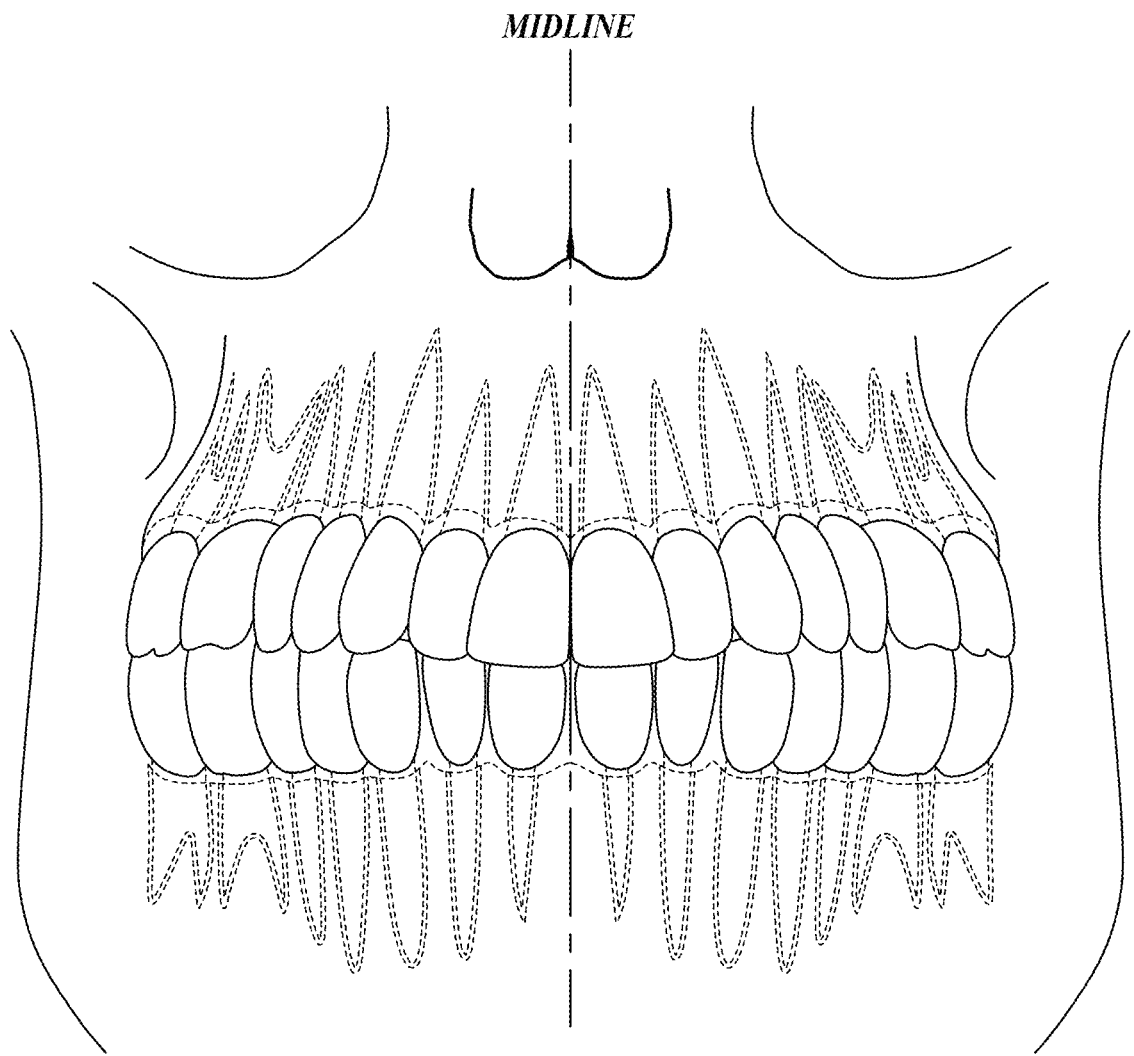
FIGS. 14A-14B depicts an image of an upper and lower jaw before and after atraumatic tooth extraction performed in accordance with exemplary aspects of the pre-prosthetic ridge preservation process of FIG. 9.
Figure 14B:
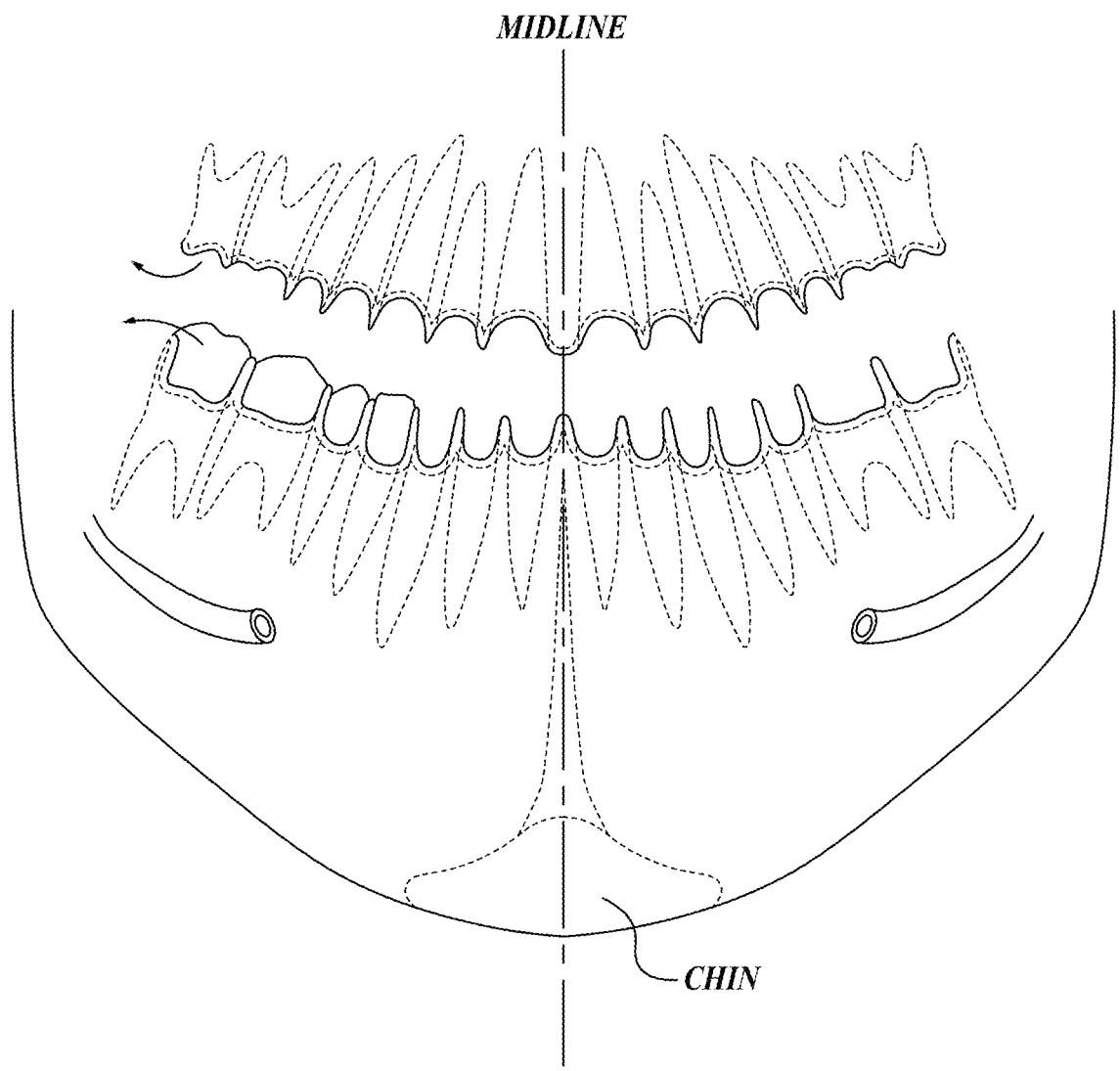
Figure 15A:
FIG. 15A depicts a photograph image of a patient's upper jaw showing all teeth extracted using an atraumatic tooth extraction process performed in accordance with exemplary aspects of the pre-prosthetic ridge preservation process of FIG. 9.

FIGS. 14A and 14B shows a drawing of an upper and lower jaw before and generally after atraumatic tooth extraction performed in accordance with exemplary aspects of the pre-prosthetic ridge preservation process described herein. FIG. 15A depicts a photograph of a patient's upper jaw showing post-extraction root sockets just after all teeth were extracted using an atraumatic tooth extraction process performed in accordance with exemplary aspects of the ridge preservation process described herein. As noted above, all four walls of the post-extraction root socket (e.g., the 360-degree enclosed wall of the socket) are substantially left intact using the pre-prosthetic ridge preservation process. The pre-prosthetic ridge preservation process substantially preserves the alveolar bone and the full height of the dental inter-radicular ridge.

After the teeth are extracted, steps are taken to ensure appropriate healing of the post-extraction root sockets in preparation for implant placement. In addition to cleaning the post-extraction root sockets (such as with saline rinse), the walls of each socket may be inspected to ensure that all four walls (360 degrees) are intact, and if not, appropriate measures are taken to restore the socket walls (e.g., bone grafting). The gingiva and interdental papilla may also be inspected to ensure they are intact, and if not, appropriate measures are taken to restore the tissue (e.g., sutures for closing the gingiva). Temporary dentures are placed in the patient's mouth for use during the healing process.

Figure 15B:
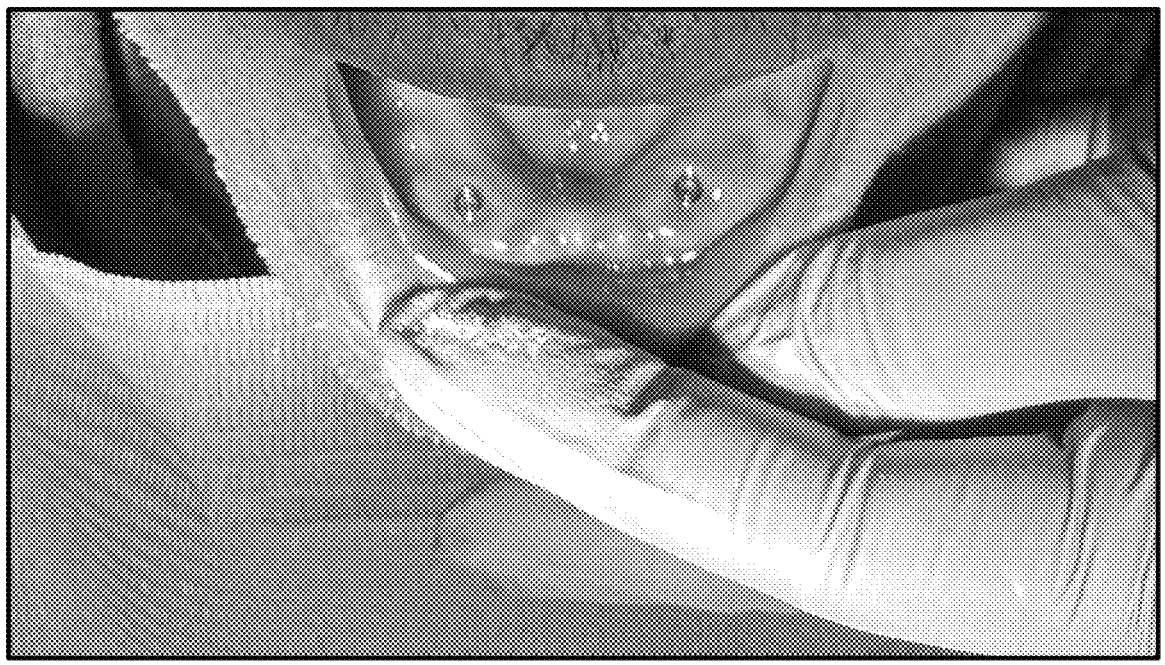
FIG. 15B depicts a photograph image of a patient's lower jaw showing post-extraction sockets about two months after all teeth were extracted using an atraumatic tooth extraction process performed in accordance with exemplary aspects of the pre-prosthetic ridge preservation process of FIG. 9.

FIG. 15B depicts a photograph image of a patient's lower jaw showing post-extraction sockets about two months after all teeth were extracted using an atraumatic tooth extraction process performed in accordance with exemplary aspects of the pre-prosthetic ridge preservation process described herein. In this example depicted, bone remodeling has occurred, and the socket tissue has substantially healed. Note that an outline of each post-extraction socket is generally defined by a dimple in the gum line, thereby providing a visual indication of the location of the socket for implant placement. In that regard, if a patient has healed in the manner depicted in FIG. 15B, the patient may be ready for implant placement, generally described below. In that regard, two implants are shown placed into formed sockets of the lower jaw in the image of FIG. 15B.

Placement of Implants

Exemplary aspects of steps for placing implants into post-extraction root sockets preserved using the pre-prosthetic ridge preservation process or another process that produces similar results, will now be described with reference to FIGS. 16A-16B and 17A-17C. Generally, in accordance with the examples described herein, tooth-sized (non-angulated) implants are secured in the preserved post-extraction root sockets. The tooth-sized (non-angulated) implants can be used even in the posterior region of the jaw (e.g., the first molar tooth socket) because the implants can be secured in the alveolar bone of the patient. In other words, angulated implants, as used in the prior art method, are not necessary because sufficient posterior jawbone density is preserved (i.e., it is not removed during the pre-prosthetic surgery as in the prior art method).

The tooth-sized (non-angulated) implants may be placed into the appropriate post-extraction root sockets at the most favorable stage of ossification, such as when the bone cells are actively forming new cells (osteoblasts) and these new cells can osseointegrate with the implants. In general, the implants may be placed in the post-extraction sockets after sufficient bone remodeling is complete and the socket tissue is healed (e.g., 30-60 days after extractions), as generally shown in FIG. 15B. The implants, once osteointegrated, are used to secure the dental bridge 100 to the jaw of the patient.

Figure 16A:
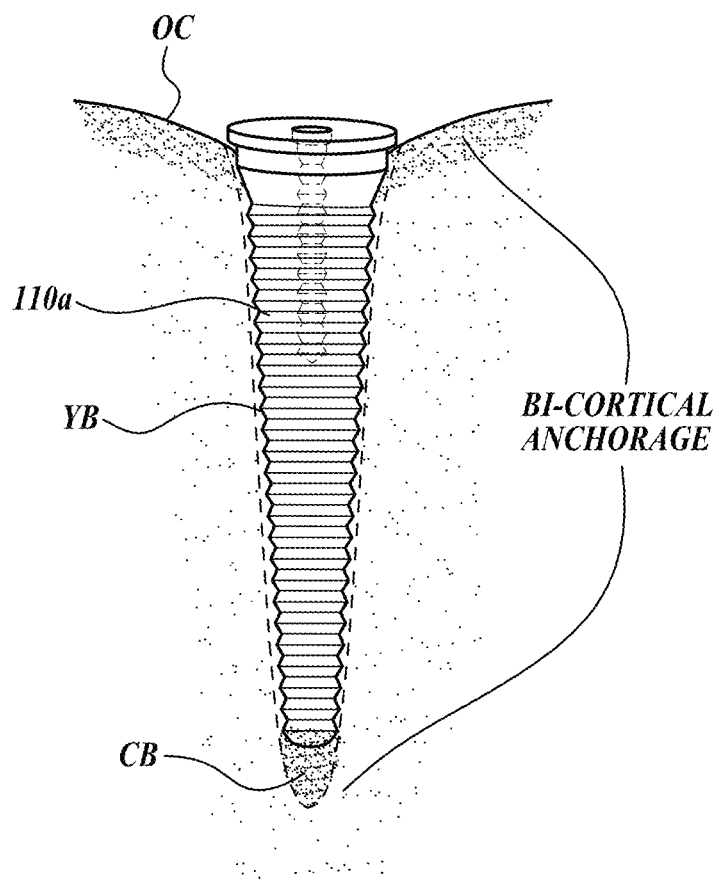
FIG. 16A depicts a front view of bi-cortical anchorage of an implant placed within a tooth socket preserved in accordance with exemplary aspects of the pre-prosthetic ridge preservation process of FIG. 9.

Referring to FIG. 16A, within a short period of time after tooth extraction, osteoblast/osteoclasts interaction and remodeling takes place and re-fills socket space with a new young bone YB. The new young bone YB, which is not yet hard and calcified, is soft, malleable, and generally easy to work with. As a result, an implant 110 can often be placed into the young bone YB without osteotomy (drilling away bone). In most instances, the implant 110 can be placed in the young bone YB without the need to even drill a pilot hole.

As noted above, apical pressure applied during extraction condenses the apical part of the alveolar bone. More specifically, the bone cells are concentrated at the apical part of the alveolar bone, forming a cortex-like layer of the bone or condensed bone CB. The condensed bone CB at the apical part of the alveolar bone, which is hard and thick, can be used for bi-cortical anchorage of the implant 110, as shown in FIG. 16A. Bi-cortical anchorage results when the implant is engaged inside the thick cortical bone from the platform (or the top of the implant) and from the apex of the implant. As can be seen in FIG. 16A, the platform of the implant 110 is engaged in the outer cortex OC of the ridge of the alveolar bone and the apex of the implant is engaged in the condensed bone CB at the apical part of the alveolar bone. The body of the implant 110 is within the softer, young bone YB. Bi-cortical anchorage of the implant within the preserved alveolar bone minimizes any failure of the implant, e.g., it provides superior anchorage resistance, reduced cortical bone stress, and superior stability compared to, for instance, mono-cortical anchorage.

Tooth or socket sized implants are placed into a necessary number of sockets to secure the dental bridge to the preserved ridge. For instance, in the examples shown in FIGS. 16B and 17A (as well as FIG. 8), four implants are placed into four corresponding sockets for a full mouth replacement. Specifically, for the upper jaw UJ on a first side, an anterior tooth-sized implant 104*a* is secured in the canine tooth socket, and a posterior tooth-sized implant 108*a* is secured in the first molar tooth socket. Similarly, an anterior tooth-sized implant 104*b* is secured in the canine tooth socket on a second side of the upper jaw UJ, and a posterior tooth-sized implant 108*b* is secured in the first molar tooth socket on the second side of the upper jaw UJ. A similar implant arrangement may be used for the lower jaw LJ (see FIGS. 8 and 17A).

The implants are placed in sockets for former teeth #3 (upper right first molar), #6 (upper right canine), #11 (upper left canine), and #14 (upper left first molar) (see FIG. 8, which shows anterior and posterior-sized implants 104*a*/104*b* and 108*a*/108*b* secured in the canine and first molar tooth sockets, respectively, of an upper jaw UJ). Generally, such implant placement provides sufficient canine to molar spread (e.g., good anterior-posterior distance), which provides good retention and stability for the dental bridge 100.

In some cases, there may be insufficient bone in one or more of the above-noted locations. In such an instance, the placement of the implant can be moved one tooth (socket) mesially (e.g., placing posterior tooth-sized implant 108*a* in the upper second bicuspid tooth socket rather than in the first molar tooth socket) and/or an additional implant may be placed in the respective quadrant of the jaw. If there is insufficient bone between the maxillary sinus cavity and the posterior ridge, then a short implant (e.g., of about 8 mm height and 4.3 mm width) may be used, wherein the apex of the implant engages the bony floor of the sinus cavity floor having condensed bone, as shown for implants 108*a* and 108*b* in FIG. 16B (see also FIG. 17A).

When placing the implants (typically after local anesthetization), there is typically no need to incise the gingiva or lay a flap in order to expose the underlying bone, and there is further typically no need to drill a pilot hole. Rather, when using the pre-prosthetic ridge preservation process described herein, the socket space is typically well defined. More specifically, after the extraction socket has healed, it typically shows a clear dimple of the former tooth location because the pre-prosthetic ridge preservation process described herein substantially maintains the alveolar bone in its entirety, and the outline of the socket shows through the gingiva (see FIG. 15B). In that regard, the implant may be driven directly into the socket through the newly healed-over gingiva until it is substantially flush with the gingival-periosteal interface. However, if preferred, the gingiva may be released at the height of the alveolar ridge (such as with a #15 blade and periodontal elevator to lay a full thickness mucoperiosteal flap less than about 5 mm on buccal and 2 mm on palatal direction) to expose the bony ridge over the former tooth socket before implant placement.

The implants may be placed into the former tooth sockets (root sockets) either free handed or with the aid of a surgical guide (e.g., TruGuide™) generated, for instance, from the CBCT scan and/or an intraoral scan. If a surgical guide is used, the guide is placed over the gums, and sleeves inside the guide may assist in placing the implants into desired positions within the sockets.

Figure 16B:
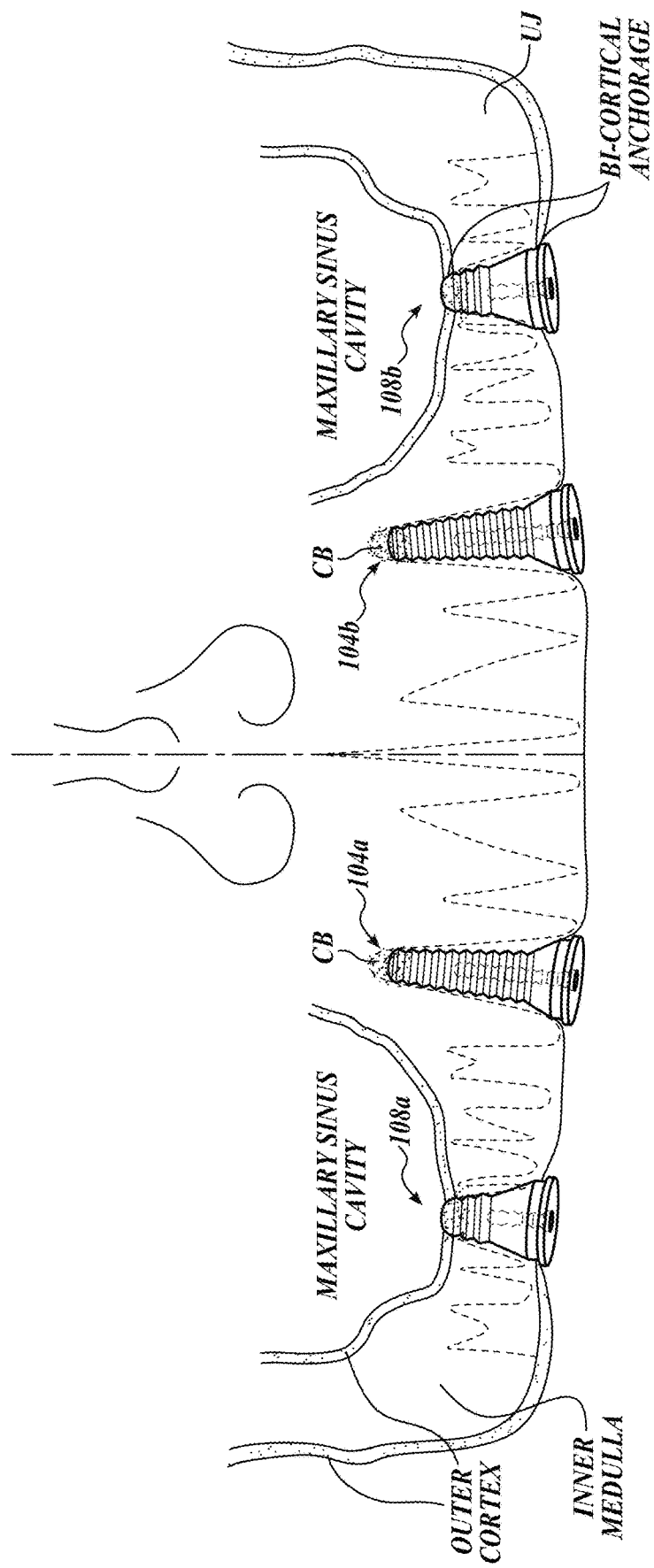
FIG. 16B depicts a front view of a plurality of implants placed within tooth sockets of an upper jaw of a patient, wherein the tooth sockets were preserved in accordance with exemplary aspects of the pre-prosthetic ridge preservation process of FIG. 9.
Figure 17A:
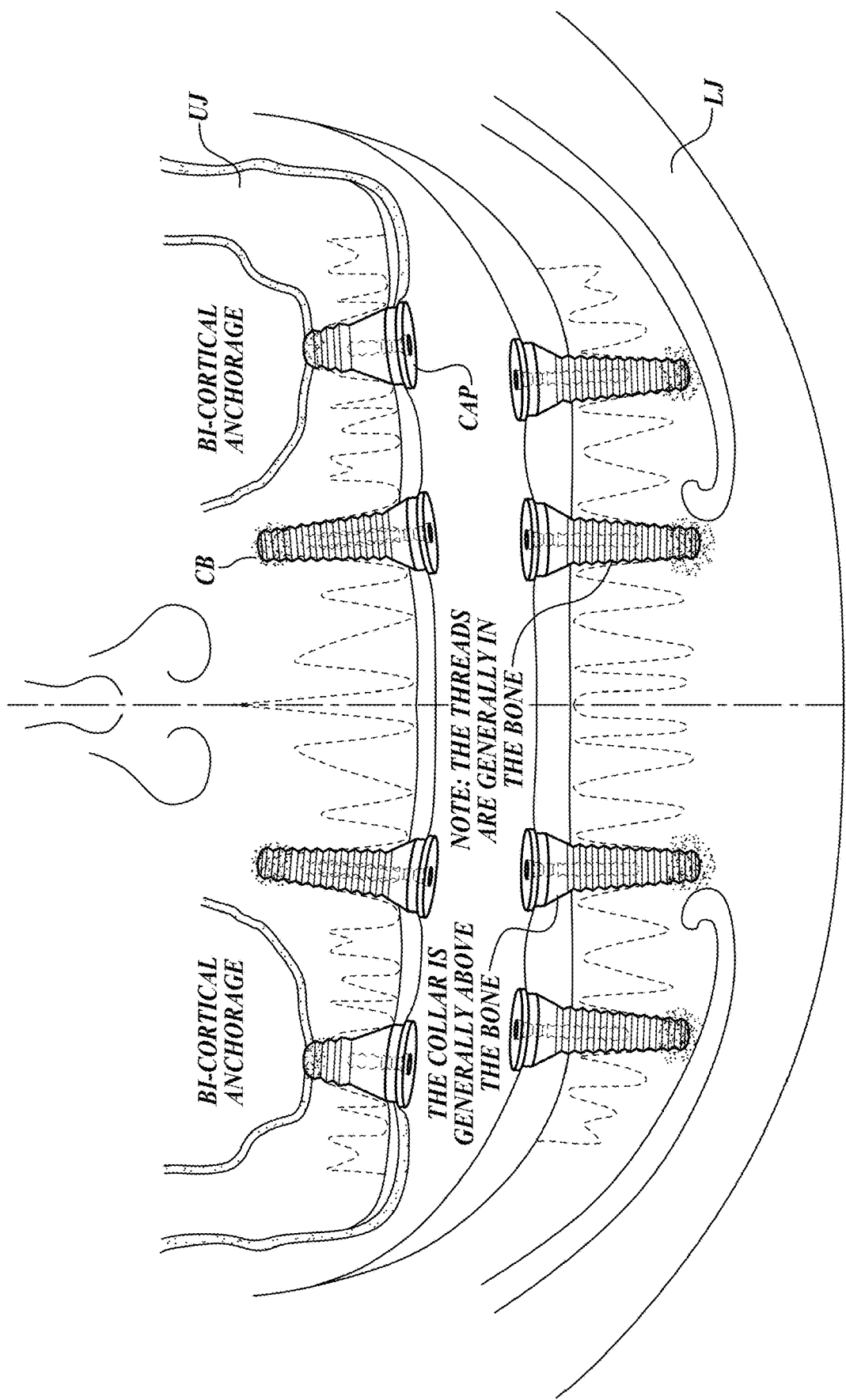
FIG. 17A depicts a front view of a plurality of implants placed within tooth sockets of upper and lower jaws of a patient, wherein the tooth sockets were preserved in accordance with exemplary aspects of the pre-prosthetic ridge preservation process of FIG. 9, and wherein healing caps have been secured to each of the implants.

Each of the implants are placed into the sockets such that a longitudinal axis of each of the implants is substantially coaxially aligned with a longitudinal axis of the corresponding tooth root, as shown in FIGS. 16A, 16B, and 17A (see also FIG. 8). In this manner, the implant substantially harmoniously resembles the roots of the original teeth. Moreover, when secured within the sockets, the implant is safely housed within the jawbone, and it does not protrude buccally or lingually from the bone.

The root socket longitudinal axis may be determined during, for instance, the CBCT scan and/or an intraoral scan analysis at the beginning of the pre-prosthetic ridge preservation process and/or after atraumatic extraction is complete. The implant longitudinal axis and the root socket longitudinal axis may be aligned using suitable surgical guide software tools integrated with or associated with the CBCT scan and/or an intraoral scan software (such as 3Shape™ TRIOS™ scanner and its associated software platform).

Figure 17B:
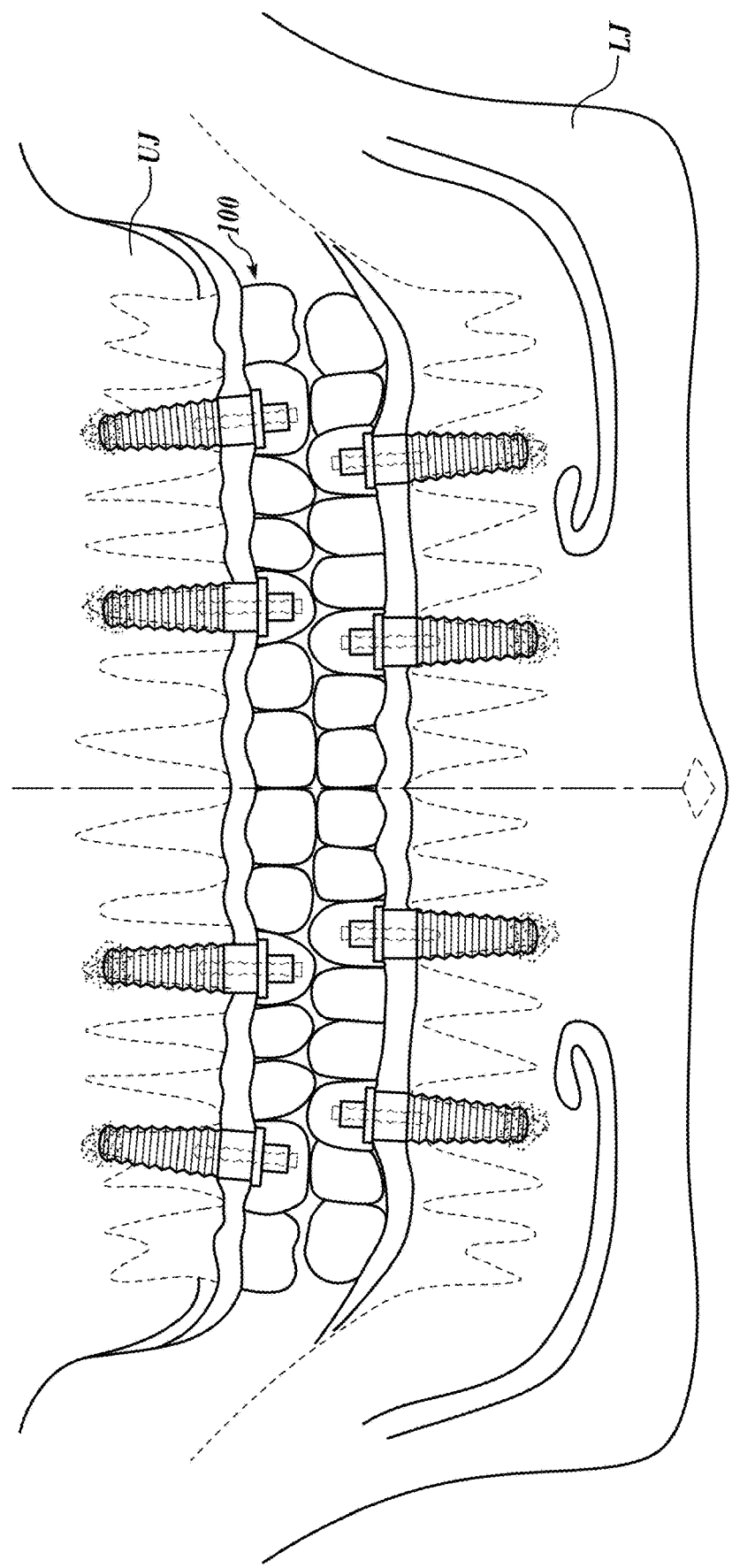
FIG. 17B depicts a front view of first and second dental bridges formed in accordance with exemplary aspects of the present disclosure secured to upper and lower jaws of a patient, respectively, using a plurality of implants placed within tooth sockets of the upper and lower jaws of a patient, wherein the tooth sockets were preserved in accordance with exemplary aspects of the pre-prosthetic ridge preservation process of FIG. 9.
Figure 17C:
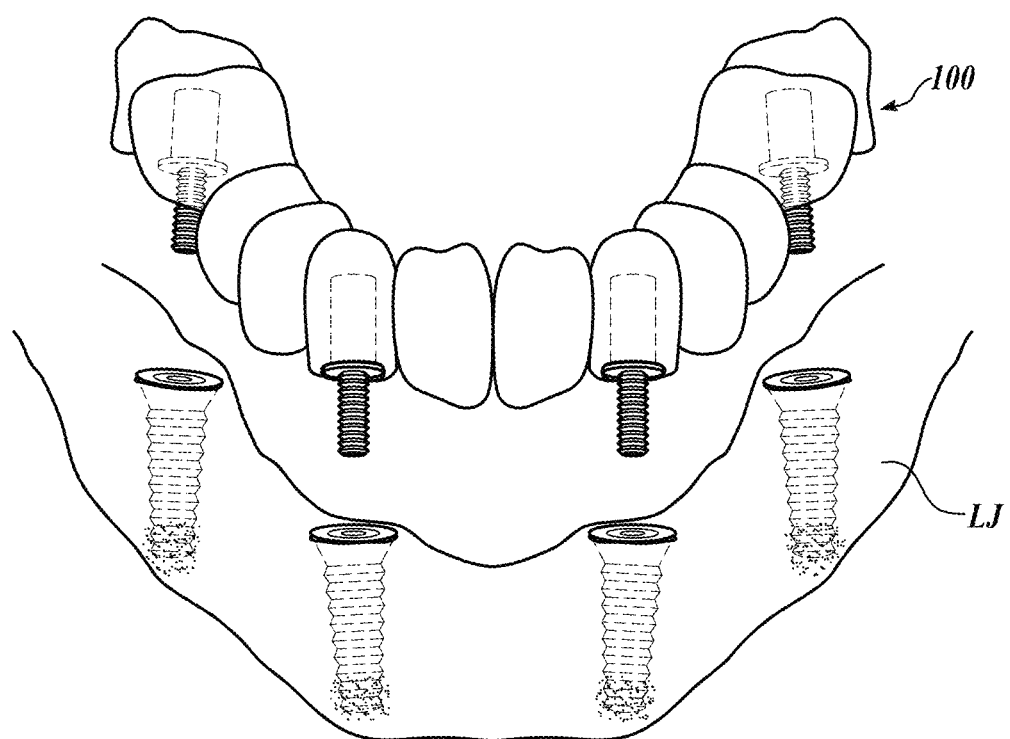
FIG. 17C depicts an isometric view of a dental bridge formed in accordance with exemplary aspects of the present disclosure being secured to a lower jaw of a patient.

Referring to FIGS. 17A-17C, the implants are preferably placed in the root sockets such that a collar or neck of the implant protrudes from the tooth socket. More specifically, the oblique threads defined on the body of the implant may be disposed in the newly ossifying portions of the alveolar bone defining the socket, the fine threads (not shown in detail) may be disposed in the outer cortex layer of the bone, and the collar of the implant may be located generally above the outer cortex layer of the bone at least partially in the gingiva layer. For instance, the collar of the implant may be placed in a cleansable area of an upper-most periosteal layer of the bone/gingiva interface. In this manner, the implant can be accessed and engaged by the abutments when installing the dental bridge 100. More specifically, the collar of the implant can be accessed by both engaging and non-engaging abutments embedded within the dental bridge 100. By comparison, angulated implants used for the All on 4 method or similar locate the collar of the implant entirely within the bone.

As can be seen in the FIGS., the socket-sized and socket-based implants are generally tapered to substantially match at least a portion of the shape of the post-extraction socket. In this manner, the implant, when placed, does not substantially disturb the height and width of the patient's original true ridge. In other words, the tapered implants are substantially received within the post-extraction socket without destroying other portions of the alveolar bone surrounding the socket. In one example, the socket-sized and socket-based implants are Hahn™ tapered implants available from Glidewell Direct of Irvine, CA.

Each implant is sufficiently torqued, such as to about 35 Ncm or higher (e.g., to about 35 Ncm to 40 Ncm), and a healing cap (see FIGS. 17A and 17B) is placed and sufficiently torqued, such as to about 15 Ncm. If sufficient torque is not achieved, an additional implant may be added to a nearby socket and torqued to a sufficient level, such as to about 35 Ncm or higher. Achieving bi-cortical anchorage of the implant helps allow the implant to be sufficiently torqued.

In cases where the implant is placed but cannot be torqued such that the platform of the implant is substantially flush with the gingival-periosteal interface, the implant hole may be deepened slightly (such as with a 3.5 mm bur of length 11.5 mm) to allow the implant to go deeper into the bone. However, special care is taken to avoid over-enlarging the implant hole, which would likely compromise the engagement of the implant with the alveolar bone in the socket.

After the implants are placed, the patient may continue to wear dentures as the primary means of replacement teeth during osseointegration. In that regard, the dentures are adjusted as needed to ensure there is no interference with the healing caps on the implants. The patient continues to wear dentures a sufficient amount of time to allow for osseointegration of the implants (e.g., 3-6 months). Osseointegration of the implants occurs when the implants have sufficiently healed and integrated with existing bone in each jaw. At this point, healing caps may be removed from the implants and replaced with scan bodies, and digital and actual impressions may be taken to capture the angulation of the implants and the naturally shaped gingival ridge achieved by the atraumatic extractions.

The dental bridge 100 may then be created using the CBCT scan data, the intraoral scan data (e.g., data relating to the implant longitudinal axis and/or the root socket longitudinal axis) and/or the impression data. Aspects of the dental bridge 100, such as the design of the bridge for securing to a patient's jaw prepared using the pre-prosthetic ridge preservation process or another suitable process, will be described below.

Exemplary Aspects of the Dental Bridge

A dental bridge 200 formed in accordance with exemplary aspects of the present disclosure will now be described with respect to FIGS. 18-24. Although not identically shown in FIGS. 18-24, each dental bridge shown in FIGS. 18-24 (as well as FIGS. 25-28) are identified by reference numeral 200 for ease of description.

The dental bridge 200 is generally a full-arch (e.g., fourteen teeth, twelve teeth, or ten teeth) dental bridge made from zirconia or a similar material to provide the strength of natural teeth. The dental bridge 200 is made without artificial gingiva such that it can attach to socket-based implants for a full mouth teeth replacement. In that regard, the dental bridge 200 is generally configured to be secured to socket-based implants secured in a patient's jaw having teeth removed atraumatically, such as using the pre-prosthetic ridge preservation process described herein, or another suitable process.

Figure 18:
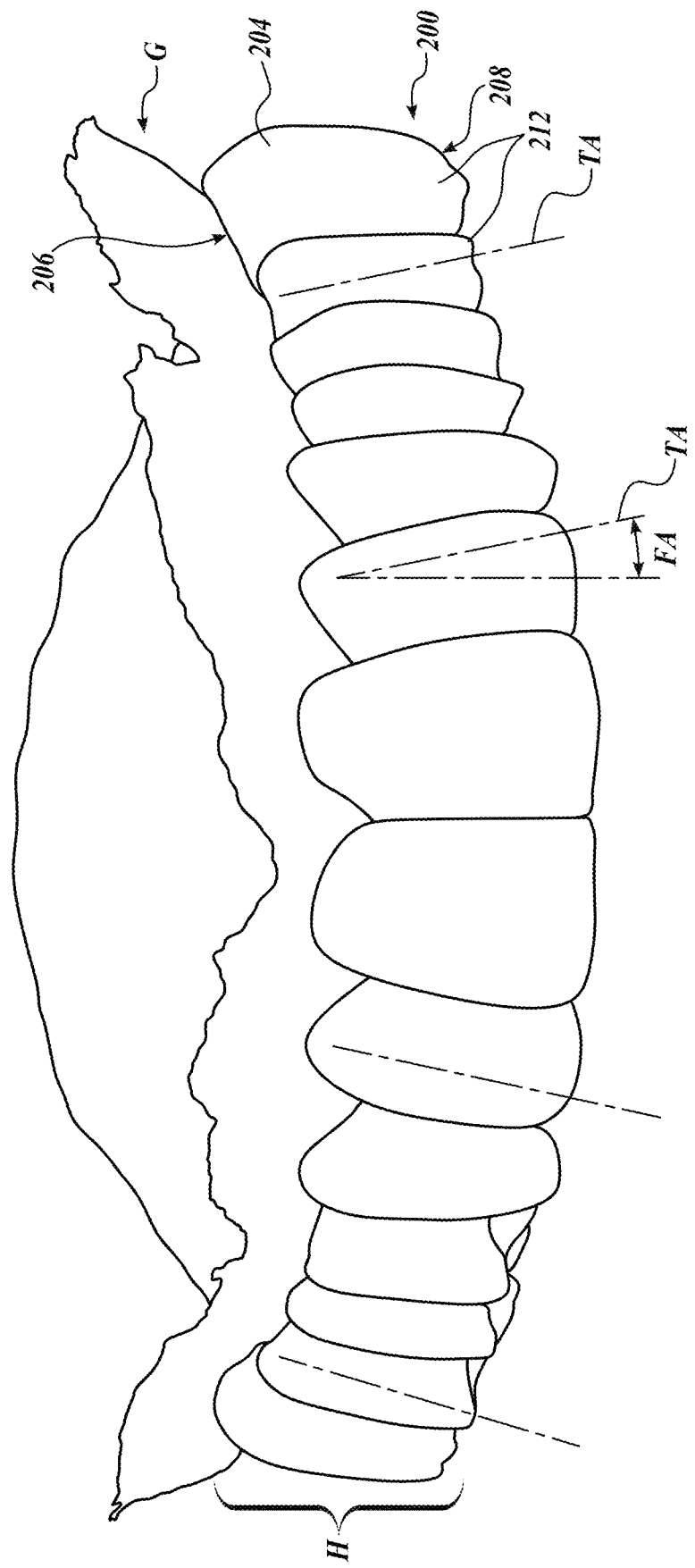
FIG. 18 depicts an isometric view of an example of a fourteen teeth dental bridge shown seated against a ridge/gingiva of a patient's upper jaw preserved in accordance with exemplary aspects of the pre-prosthetic ridge preservation process of FIG. 9.

FIG. 18 depicts an example of a fourteen teeth dental bridge 200 shown seated against the ridge/gingiva G of a patient's upper jaw. The dental bridge 200 includes a generally arc-shaped body 204 made from zirconia or a similarly strong, non-porous (e.g., non-staining), hygienic material to provide the strength of natural teeth while still being generally light weight. Along its height, the body 204 extends between a gingival side 206 and an occlusal/incisal side 208 to generally define a height H of the body 204 that is a height of natural teeth protruding from a gingival ridge.

The body 204 defines a plurality of teeth portions 212 extending along its arced length that are shaped and sized to generally mimic the teeth required for a full mouth teeth replacement. The dental bridge 200 is shown having fourteen teeth portions 212, including four incisors, two canines, four premolars and four molars. It should be appreciated that a fourteen teeth dental bridge for use with a patient's lower jaw would have similar features and will therefore not be separately described. Moreover, it should be appreciated that a ten or twelve teeth upper or lower dental bridge would have similar features and will therefore also not be separately described.

The gingival side 206 of the dental bridge 200 is configured to seat against a patient's gums G, which are left intact during the pre-prosthetic ridge preservation process, and which follow the contour of the patient's original bony ridge. In that regard, the dental bridge 200 is custom-made to fit the unique shape and contours of the patient's gum line defined by the preserved tooth sockets. When mated to the patient's original bony ridge, parallelism is substantially achieved between the interpupillary line (the line between the left and right pupils) and the occlusal plane (OP) of the patient (e.g., the average plane established by the incisal and occlusal surfaces of the teeth) as well as between the ala-tragus line (ATL) and the OP.

Further referring to FIGS. 19-20, exemplary aspects of the dental bridge 200 for allowing the bridge to fit the unique shape and contours of the patient's gum line defined by the preserved tooth sockets will now be described. Generally, the gingival side 206 of the dental bridge 200 has an ovate pontic contour that generally follows the gingival contour of the patient (e.g., the unique shape and contours of the patient's gum line defined by the preserved tooth sockets). In other words, the ovate pontic contour of the gingival side 206 of the bridge 200 is designed to substantially mate with the correspondingly-shaped residual tissue ridge of the gums G preserved during the pre-prosthetic ridge preservation process. In that regard, each tooth portion 212 is generally of an ovate pontic shape to define an ovate pontic contour on its gingival side 206. As can be appreciated, the ovate pontic shape of each tooth portion 212 substantially mimics the shape of the natural root and crown for that tooth.

Figure 19A:
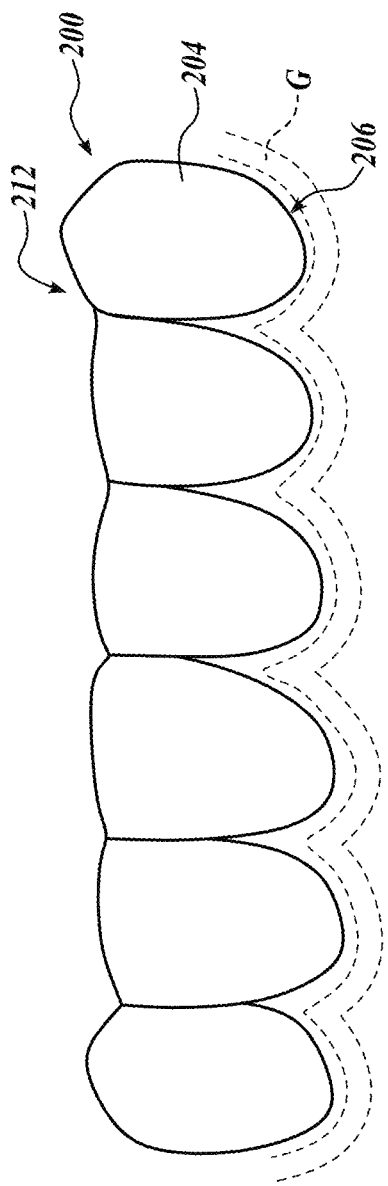
FIGS. 19A-19C depicts front and side views of portions of a dental bridge shown seated against a ridge/gingiva of a patient's jaw preserved in accordance with exemplary aspects of the pre-prosthetic ridge preservation process of FIG. 9.
Figure 19C:
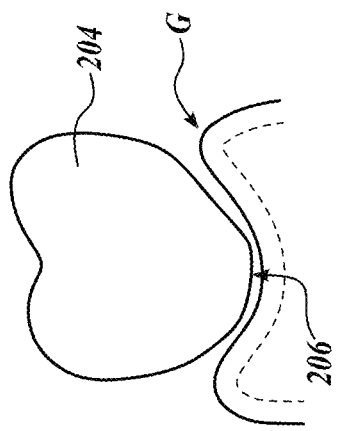
Figure 19B:
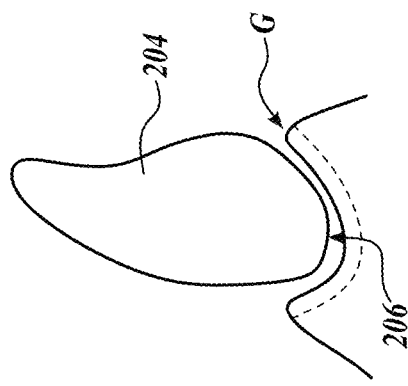

FIGS. 19A-19C depict illustrations of a dental bridge 200 as well as individual teeth portions 220 and 223 showing the generally ovate pontic contour of the gingival side 206 designed to substantially mate with the correspondingly shaped residual tissue ridge of the gums G. Specifically, FIG. 19A depicts a front planar view of a dental bridge 200 showing an ovate pontic contour of a gingival side 206 of the bridge body 204. As can be seen, the gingival side 206 of the bridge body 204 has an ovate pontic contour, with each tooth portion 212 having a generally ovate pontic shape on its gingival side that generally corresponds to the shapes of the depressions left in the residual tissue ridge of the gums G. FIG. 19B shows a side (lateral) view of an incisor tooth portion, and FIG. 19C shows a side (lateral) view of a molar tooth portion, each having an ovate pontic shape/contour on its gingival side 206 that substantially matches the contour of the residual tissue ridge R.

The ovate pontic shapes of each tooth portion may be either generally convex, concave, or a combination thereof to substantially match the bumps, valleys, and contours of the residual tissue ridge. For instance, FIG. 20 shows a bridge 200 having an ovate pontic shape/contour on the gingival side 206 of its body 204, with a first molar tooth portion 226 generally having a convex ovate shape and a second molar tooth portion 228 having a generally concave ovate shape.

Figure 21:
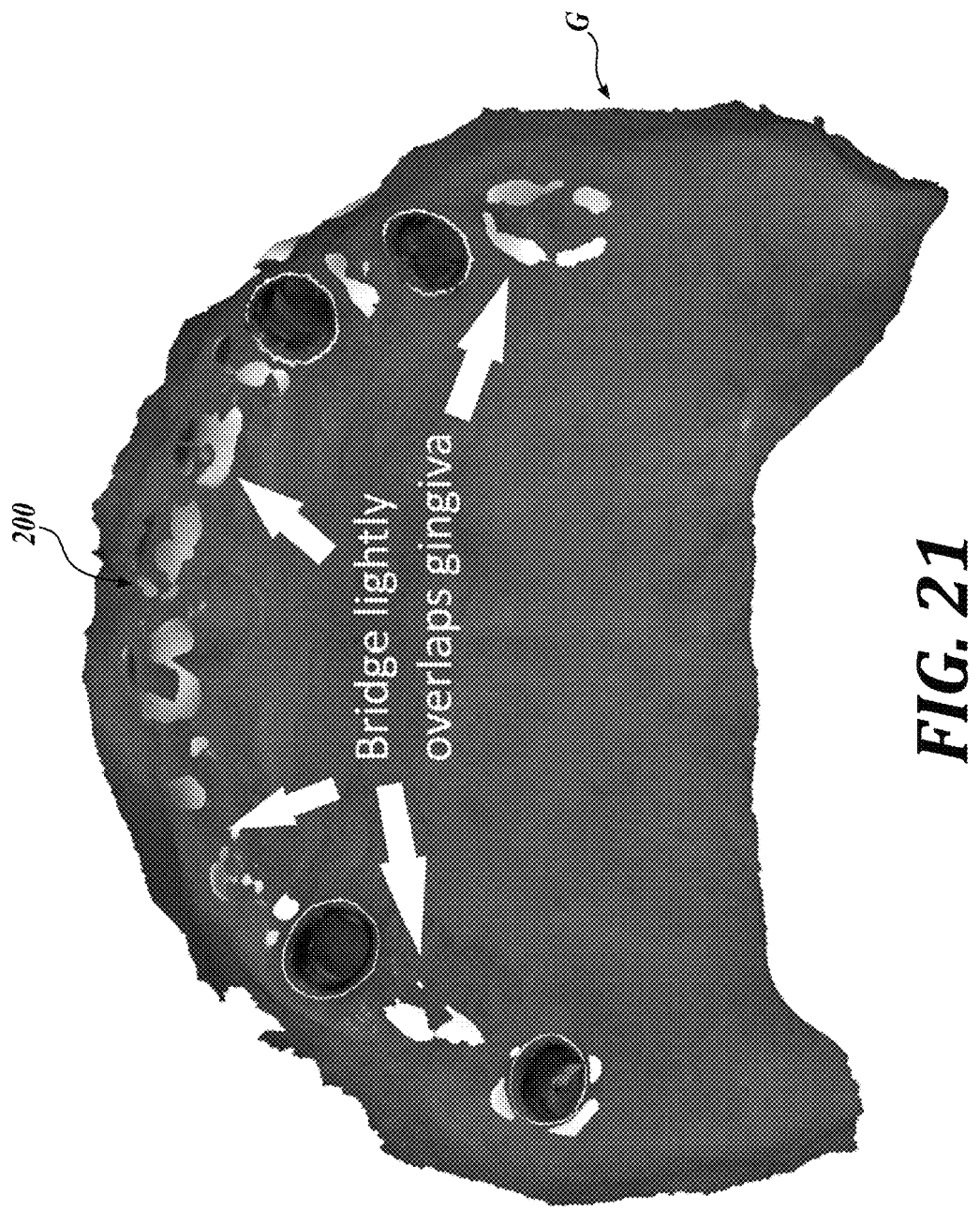
FIG. 21 depicts a bottom view of an upper jaw of a patient showing portions of a dental bridge formed in accordance with exemplary aspects of the present disclosure at least partially overlapping the gingiva of the patient.
Figure 22:
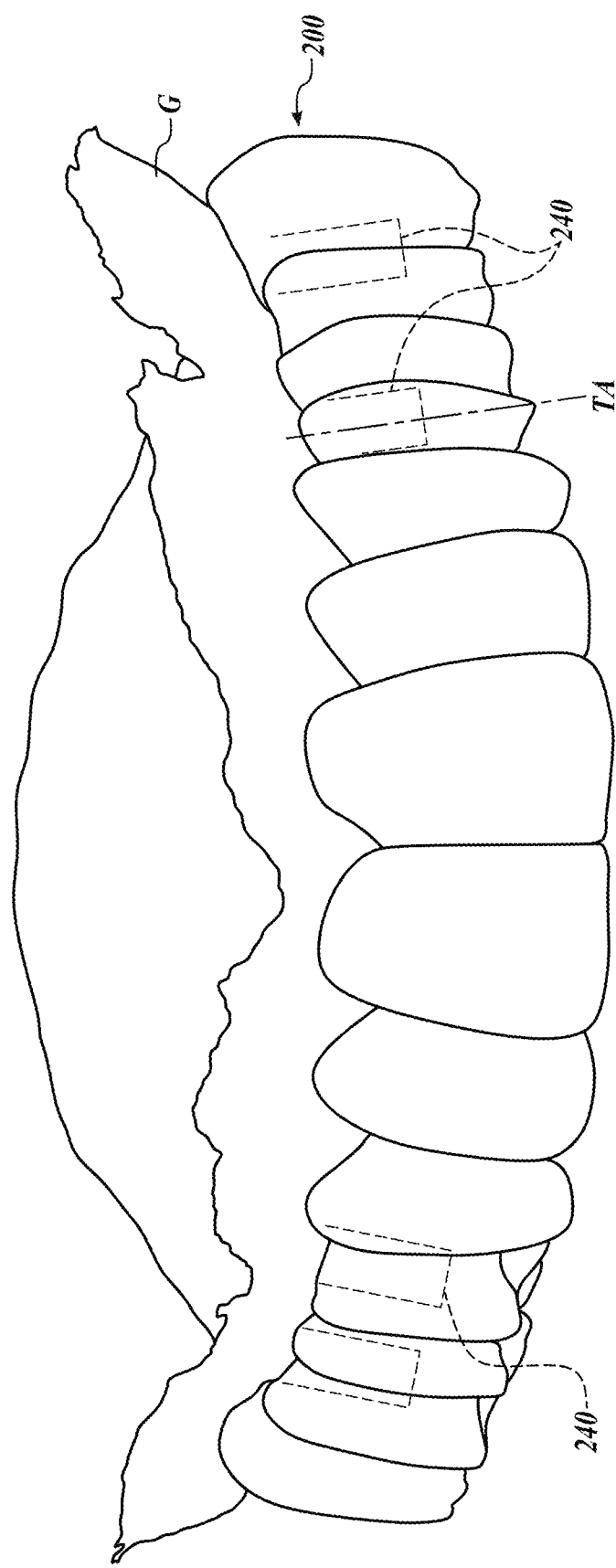
FIG. 22 depicts a front view of a dental bridge formed in accordance with exemplary aspects of the present disclosure shown secured to a patient's upper jaw.

Referring to FIG. 21, the ovate pontic shape/contour of the gingival side of bridge 200 defines a gingival interface that is configured to slightly overlap with or penetrate with the gingival surface of the gum G. Such overlap ensures a tight fit, with substantially no gap defined between the ovate pontic gingival interface of the dental bridge 200 and the gum G. As can be appreciated, any gaps or irregular surfaces would be difficult to clean.

For instance, prior art methods such as the All-on-4 method cut down and flatten the bone, eliminating the tooth sockets entirely as well as major portions of the gingiva. As a result, the All-on-4 bridge requires an artificial gum portion having a substantially flat bottom that must rest on the "bulldozed" bone/gingival surface. Resting a flattened bottom artificial gum portion against a flattened bone/gingival surface results in undercuts and hidden areas for food entrapment (see the gaps between the prosthetic P and the patient's gums in FIG. 7). By comparison, the dental bridge 200 formed herein ensures a tight fit between the bridge and the patient's gums.

Moreover, the All-on-4 bridge must be significantly bigger to replace not only the original teeth, but the lost bone and gingiva. For instance, the prosthetic P shown in FIGS. 2-4 is about one-half inch in height (½"). By comparison, the dental bridge 200 has a height H that is only about one-eighth inch in height (⅛") when seated against a patient's gums (see FIG. 18).

Referring back to FIG. 18, the arc-shaped body 204 of the dental bridge 200 has an overall flared shaped to accommodate the anatomical shape of the patient's palette at the intersection of the gingiva. For instance, each tooth portion 212 has a tooth axis TA extending buccally (and sometimes distally and/or mesially) from its gingival side 206 to the incisal/occlusal side 208 (e.g., the bottom of the bridge to the top of the bridge). The tooth axis TA is generally the same as the longitudinal axis of the original teeth, and therefore, the tooth axis TA is generally the same as the longitudinal axis of the preserved tooth sockets and the implants placed into the sockets. The tooth axis TA is typically offset from a vertical axis by a flare angle FA. Generally, the flare angle is between 1-20° from a vertical axis, such as between 10-15° from a vertical axis, but it varies based on patient's palate and alveolar ridge shape.

Figure 20:
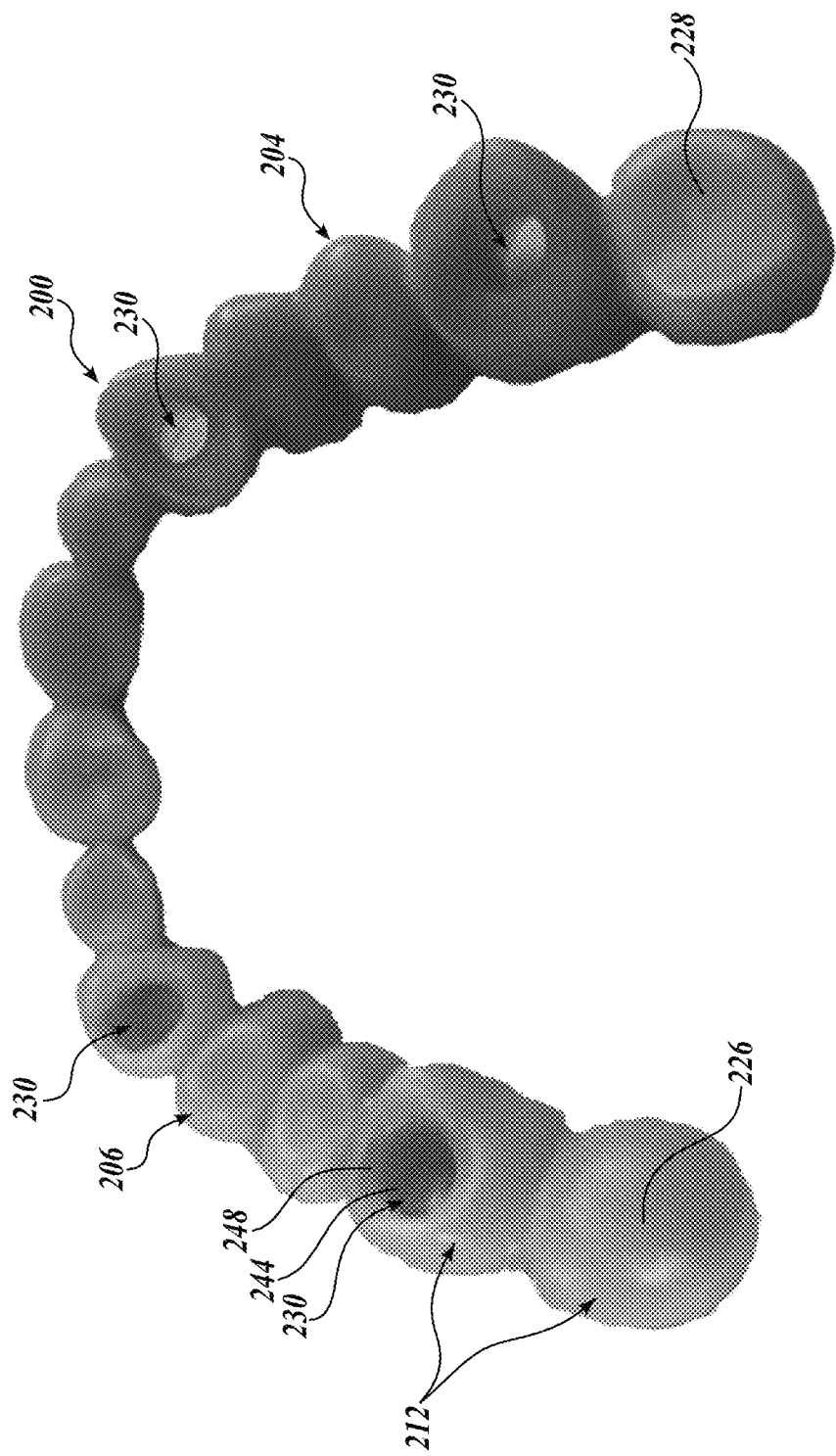
FIG. 20 depicts a bottom view of a dental bridge formed in accordance with exemplary aspects of the present disclosure.

Referring to FIG. 20, the dental bridge 200 includes a plurality of abutment holes 230 for receiving abutments/ screws for mating to implants. Each abutment hole 230 is formed in a tooth portion 212 of the dental bridge 200 corresponding to a location of an implant. For instance, for the dental bridge 200 shown in FIG. 20, an abutment hole 230 is defined in the following tooth portions of the dental bridge 200: tooth #3 (upper right first molar), tooth #6 (upper right canine), tooth #11 (upper left canine), and tooth #14 (upper left first molar). However, it should be appreciated that the abutment holes 230 may of course be defined in other tooth portions depending on the socket location of the implants.

Figure 23:
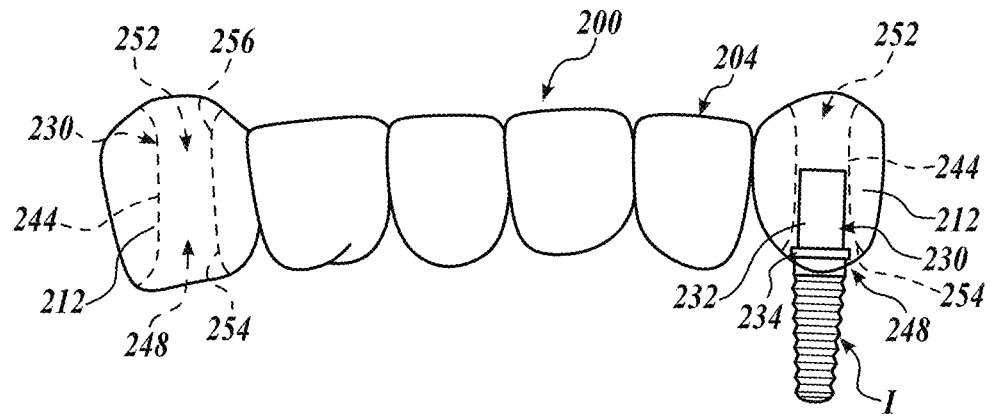
FIG. 23 depicts a front view of a dental bridge formed in accordance with exemplary aspects of the present disclosure, showing a cross-sectional shape of hidden abutment holes of the dental bridge.

In general, each abutment hole 230 is defined by a generally cylindrical through-hole 244 formed in a tooth portion 212 of the dental bridge 200 that extends between a gingival opening 248 and an incisal/occlusal opening (see incisal/occlusal opening 252 shown in FIG. 23). In some examples, the abutment hole 230 flares outwardly as it extends from an interior surface of the through-hole 244 toward the gingival or incisal/occlusal outer surface. In the depicted example, a first substantially smooth, curved, convexly shaped tooth portion interface 254 may extend between the gingival end of the through-hole 244 and the gingival outer surface of the bridge body 204 to define a gradually widened gingival opening 248. Similarly, a second substantially smooth, curved, convexly shaped tooth portion interface 256 may extend between the incisal/occlusal end of the through-hole 244 and the incisal/occlusal outer surface of the bridge to define a gradually widened incisal/occlusal opening 252. In this manner, sharp edges, which can cause tissue irritation and/or susceptibility to breakage and/or compromise fit or sealing against the gingiva, may be avoided.

The curved tooth portion interfaces 254 and 256 also help guide abutment components into engagement with the tooth portion 212. For instance, the curved tooth portion interface 256 at the incisal/occlusal opening 252 can help guide the abutment screws into engagement with the abutments. More specifically, an abutment screw shaft may be guided easily and smoothly along the curved surface of the curved tooth portion interface 256 at the incisal/occlusal opening 252 into an opening in a body 232 of the abutment 240 (see abutment screws extending from abutments 240 in FIG. 17C). Similarly, the curved tooth portion interface 254 at the gingival opening 248 can help guide the abutment body 232 into engagement with the through-hole 244. More specifically, the abutment body 232 may follow the path along the curved surface of the curved tooth portion interface 254 at the gingival opening 248 into the through-hole 244.

The abutment hole through-hole 244, which is generally an elongated cylindrical shape, has a diameter that is substantially the same size or slightly larger than a diameter of the abutment body 232. In this manner, the abutment body 232 may extend into the tooth portion 212 for securing the abutment to the bridge 200, as shown in FIG. 23. At the same time, the through-hole 244 has a diameter than is smaller than a diameter of a ring or skirt 234 of the abutment 240. In that regard, the abutment skirt 234 rests against the gingival opening 248, with the abutment body 232 extending into the abutment hole 230. The abutment skirt 234 may rest inside the gradually widened gingival opening 248 such that the skirt may be at least somewhat nested within the gingival side 206 of the bridge 200. In this manner, the abutment skirt 234 is substantially flush with the gingival side 206 of the bridge 200 when mated against the gingival opening 248.

However, as can be appreciated, the size (e.g., diameter), shape, and contour of each gingival opening 248 may differ based on the shape of the individual teeth portion 220. Accordingly, it should be appreciated that the abutment skirt 234 may be slightly recessed within the bridge body 204 or instead protrude slightly from the gingival side 206 of the bridge body to accommodate the contours of the bridge. Thus, when generally stating that the abutment skirt 234 is substantially flush with the gingival side 206 of the bridge 200, it includes any suitable location of the abutment skirt 234 relative to the gingival side 206 of the bridge 200 to accommodate mating of the abutments and implants (and therefore engagement of the bridge with the patient's preserved ridge) in the manners described herein.

Each abutment through-hole 244 is substantially coaxially aligned with the tooth axis TA of its tooth portion 212 (see FIG. 22) to enable the abutments 240 to be aligned with and mated with the corresponding implants extending along the tooth axis TA. Substantial axial alignment of the abutment through-hole 244 with the longitudinal axis of the implant allows a non-angulated abutment 240 to be received within the abutment hole 230 and secured to a socket-sized implant. In that regard, the abutment holes 230, the abutments 240, and the corresponding implants have a longitudinal axis that substantially matches the tooth axis TA to accommodate the flare of the patient's palette. Substantially axial alignment of the abutment holes 230, the abutments 240, and the corresponding implants with the tooth axis TA of the tooth portion 212 allows for optimal occlusal forces (chewing forces) to be transmitted from the tooth portions to the socket-placed implants.

As noted above, the tooth axis TA flares buccally (and sometimes distally and/or mesially) from the gingival side 206 of the bridge to the incisal/occlusal side 208 of the bridge. In that regard, the abutments 240 collectively define an overall flared shape that helps retain the dental bridge 200 on the implants. In other words, the dental bridge 200 cannot substantially move axially along the abutments 240 due to the flared or non-vertical interface defined between the abutments 240 and the abutment holes 230. Accordingly, in addition to anatomically accommodating the shape of the patient's pallet, the flared shape of the dental bridge 200 and its corresponding features (e.g., the abutment holes 230, the abutments 240, and the corresponding implants) help retain the bridge in its restoration position against the patient's gums.

However, such flared or non-vertical interface defined between the abutments 240 and the abutment holes 230 means that, during installation of the dental bridge 200, the bridge typically cannot be simply placed over abutments that are screwed into the implants. Replacement teeth are typically installed on an implant by first placing an abutment on the implant, and then securing the tooth to the abutment. Accordingly, if the longitudinal axes of the abutment holes 230 and the abutments 240 are offset from vertical (e.g., they are not perfectly parallel to one another, but rather, they flare to match the vertically offset angle of the implants), the abutment holes 230 cannot be simultaneously aligned with the corresponding abutments 240 for receiving the abutments.

One solution for accommodating the flared or non-vertical interface defined between the abutments 240 and the abutment holes 230 would be to use angulated abutments with the implants. However, angulated abutments can cause undue stress on the bridge and/or the implants when transferring biting forces from the bridge to the implants. When using angulated abutments, the biting forces are not transferred along the axis of the implant, the abutment, and the tooth portion of the bridge. Rather, the biting force must pass through the angulated abutment, which has a longitudinal axis that is offset from the longitudinal axes of the implants and the bridge tooth portion. The dental bridge of the present disclosure accommodates the flared or non-vertical interface between the abutments and the abutment holes without compromising the mechanical strength and/or interface between the bridge and the implants.

Exemplary aspects of the dental bridge 200 configured to accommodate the flared or non-vertical interface defined between the abutments 240 and the abutment holes 230 without compromising the mechanical strength and/or interface between the bridge and the implants will now be described. In general, the dental bridge 200 is designed such that abutments may first be placed inside the vertically offset abutment holes 230, and then the dental bridge 200 may be placed into the patient's mouth and screwed down into the underlying implants.

As may best be seen by referring to FIGS. 20 and 23, the abutment holes 230 may be suitably shaped, sized, and contoured to mate with or otherwise receive the abutments 240 and to allow for securing the abutments to the corresponding implants. As noted above, each abutment hole 230 is defined by a generally cylindrically shaped through-hole 244 in a tooth portion 212 that extends between an outwardly extending gingival opening 248 in the gingival surface of the tooth portion and an outwardly extending incisal/occlusal opening 252 in the incisal/occlusal surface of the tooth portion.

The through-hole 244 may have a minimum and/or maximum circumference to suitably mate with or otherwise receive the abutments 240. The minimum and/or maximum circumference of the abutment through-hole 244 may be determined using standards well known in the art. For instance, the circumference of the abutment through-hole 244 may be determined using suitable CAD modeling software (e.g., the Ivoclar™ zirconia restoration platform) or other suitable technology based on the known circumference of the chosen abutments. Moreover, the tooth portion 212 may be designed to have a sufficient size surrounding the abutment hole 230 to prevent any cracking or breakage of the tooth portion surrounding the hole. In some instances, the tooth portion 212 is intentionally enlarged to accommodate a sufficiently sized through-hole 244 (see enlarged tooth portion 213 shown in FIG. 27). For instance, a minimum tooth portion thickness of about 2 mm may surround the through-hole 244.

The abutment holes 230 may also be shaped, sized, and/or contoured to allow for alignment of and engagement of the abutments with the corresponding implants. When securing an abutment to an implant, the abutments are aligned with the implant, and then a screw is passed through an opening of the abutment and into a threaded opening of the implant. In that regard, the abutment holes 230 may be shaped, sized, and/or contoured to allow for alignment of the abutment screws with the threaded openings in the corresponding implants.

For instance, in the depicted example, the through-hole 244 may have a slightly larger diameter near the gingival opening 248 (an "enlarged diameter portion of the through-hole 244") to accommodate alignment of and installation of an abutment screw in a threaded opening of a corresponding implant. For instance, the enlarged diameter portion of the through-hole 244 may have a diameter that provides sufficient clearance for aligning and installing (torquing) the abutment screws in the threaded openings of the implants. In other words, the enlarged diameter portion of the through-hole 244 defines an opening of a sufficient diameter to allow for the abutment body 232 and the abutment screw received therein to move sufficiently laterally relative to the tooth axis TA to align the screw with the implant screw hole. In that regard, the enlarged diameter portion of the through-hole 244 allows for sufficient "wiggle room" when inserting and aligning an abutment screw through the abutment body 232 and into the implant.

The diametrical size and axial length of the enlarged diameter portion of the through-hole 244 may be defined at least in part by the size, shape, and type of the abutment, the abutment screw, and/or the implant used. For instance, the enlarged diameter portion of the through-hole 244 may be designed to have a minimum diametrical opening (e.g., near the curved tooth portion interface 254 of the gingival opening 248) that is larger than the abutment body 232 by a minimum amount, thereby allowing for sufficient lateral movement of the abutment body 232 and the abutment screws when aligning the abutment screws with the threaded openings in the implants. At the same time, the enlarged diameter portion of the through-hole 244 may be designed to have a maximum diametric al opening that is larger than the abutment body 232 by an amount to sufficient restrain the abutment body 232 with the through-hole 244 while allowing sufficient lateral movement for alignment. The enlarged diameter portion of the through-hole 244 may be sized to define minimum and/or maximum clearance between the through-hole 244 and the abutment body 232 using known mechanical clearance standards and/or through experimental use.

For instance, the inventor has found that a radial clearance of between about 1.00-2.00 mm between the through-hole 244 and the abutment body 232 (such as at the enlarged diameter portion of the through-hole 244) provides sufficient lateral "wiggle room" when inserting/installing the abutment screws while sufficiently restraining the abutment body 232 in the abutment hole 230. At the same time, the enlarged diameter portion of the through-hole 244 may have an axial length suitable for allowing lateral movement of the abutment body 232 and/or the abutment screws. For instance, the enlarged diameter portion of the through-hole 244 may have an axial length of between about 1.00-2.00 mm to provide sufficient axial "wiggle room" when inserting/installing the abutment screws. In general, the radial clearance between the through-hole 244 and the abutment body 232 and the axial length of the enlarged diameter portion of the through-hole 244 should generally not be larger than needed because it would unnecessarily remove material from the bridge tooth portion, comprising mechanical integrity.

The radial clearance and/or the axial length of the enlarged diameter portion of the through-hole 244 may be determined, for instance, using suitable CAD modeling software (e.g., the Ivoclar™ zirconia restoration platform) or other suitable technology. In the alternative or in addition, the radial clearance and/or the axial length of the enlarged diameter portion of the through-hole 244 may be determined through experimental testing using various abutment designs and sizes, abutment screw sizes, abutment hole sizes, and/or flared gingival opening circumferences/contours (e.g., a gradual v immediate flare, a curved v. straight flare ("beveled"), various axial lengths, etc.).

The overall design of the dental bridge 200, including the tooth design, bite, abutment holes 230, etc., may be uniquely designed for each patient. The dental bridge 200 may be designed at least in part using a suitable restoration platform, such as the Ivoclar™ zirconia restoration platform. Generally, the restoration platform is used to scan, design, and produce a dental bridge suitable for a patient.

For instance, to design and create an upper jaw full teeth replacement dental bridge, the upper jaw may be scanned before atraumatic extractions are performed to create a replacement dental bridge that generally mimics the shape of the original teeth. Further, the lower jaw and teeth may be scanned to ensure that the upper jaw replacement bridge suitably overlaps/engages the patient's lower teeth (whether being replaced or retained).

The upper jaw may also be scanned after atraumatic extractions are performed to ensure that the "flare" of the replacement dental bridge substantially matches the flare of the implants (as measured with scan bodies secured to the implants). In that regard, the post-atraumatic extraction scan of the upper jaw may also be used to design the abutment holes of the bridge. For instance, the abutment holes may be designed to have substantially the same longitudinal axis as the scan bodies and/or the implants. Further, the abutment holes may be designed to have a suitable opening diameter/circumference for receiving the abutments (which may be comparable in size to the scan bodies or otherwise a known circumference). Finally, the abutment holes may be designed to have a suitable diameter, at least at the enlarged diameter portion of the through-hole 244, to provide a needed clearance needed for aligning the screws in the abutments/implants, as described above.

Figure 24:
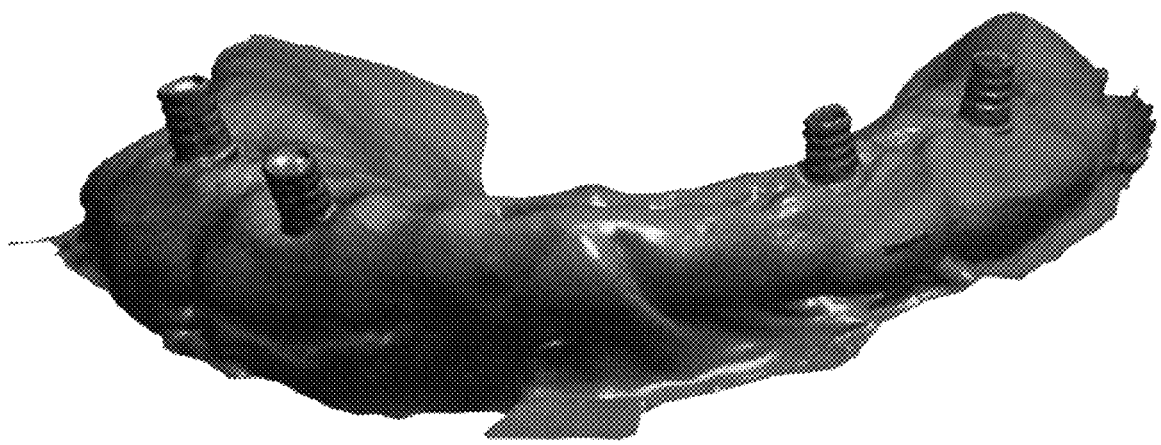
FIG. 24 depicts an intraoral scan image depicting an implant longitudinal axis (for instance, using scan bodies) for a lower jaw.
Figure 25:
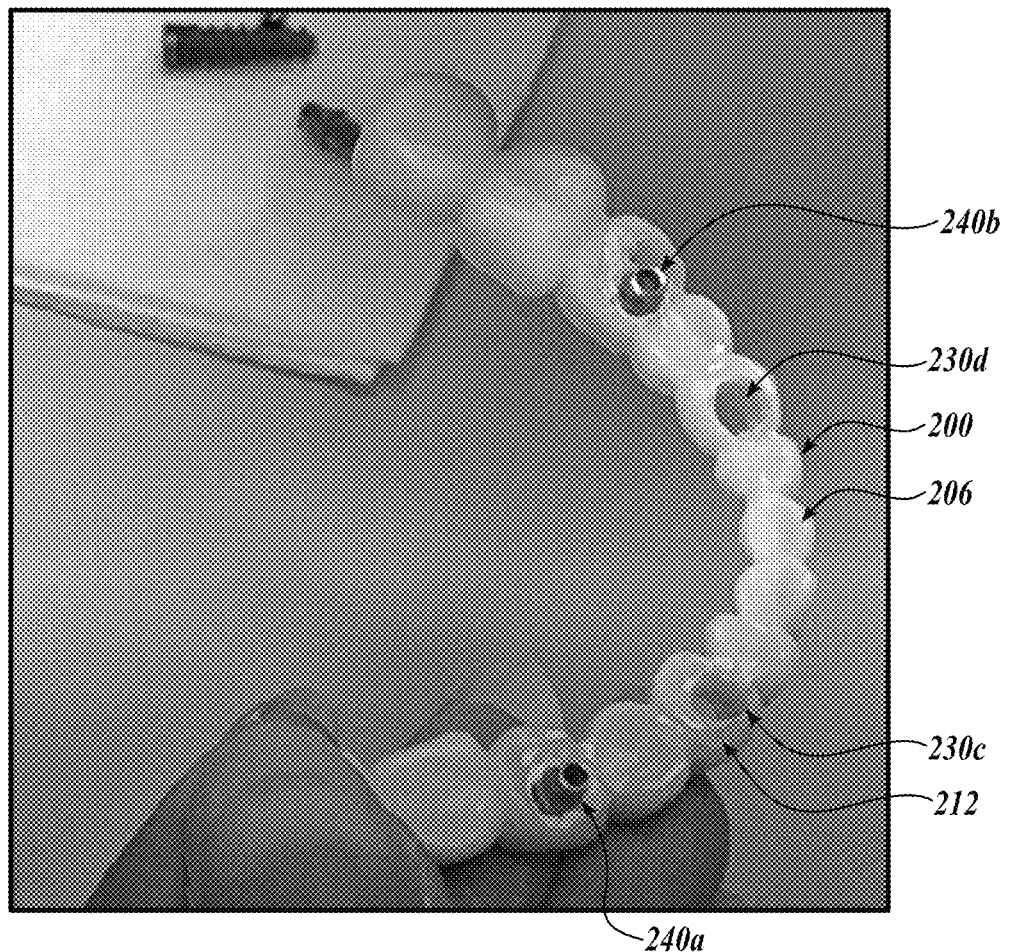
FIGS. 25-28 depict aspects of an exemplary method of installing a dental bridge formed in accordance with exemplary aspects of the present disclosure.
Figure 26:
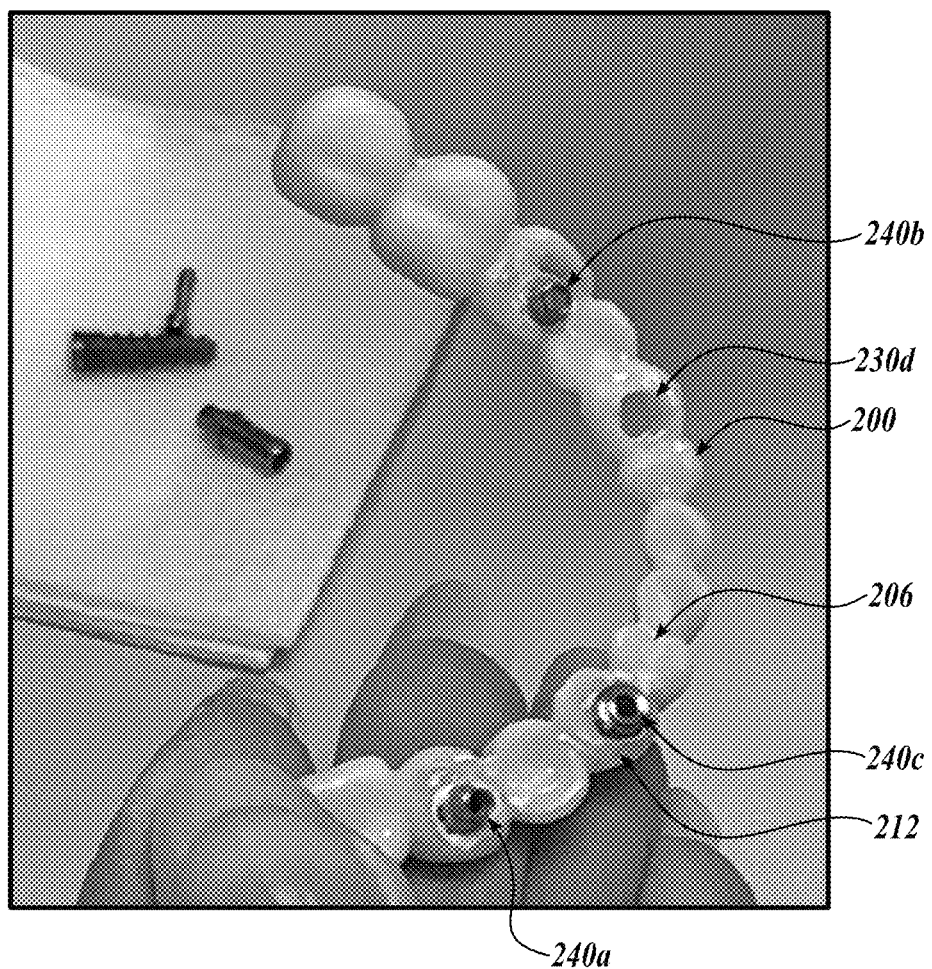

The scan data may be used to produce digital impressions that may be used to assess and modify the design of the bridge. For instance, FIG. 24 shows an intraoral scan depicting the abutment body longitudinal axis (for instance, using scan bodies) for a lower jaw. Actual impressions may also be created, as discussed above, at various stages of the pre-prosthetic ridge preservation process to aid in the bridge design. Once designed, the replacement bridge may be manufactured from zirconia or another suitable material using suitable milling/sintering techniques or the like (such as the using the milling machine and sintering furnace available from Ivoclar™). For instance, a final bridge may be custom milled from a solid piece of IPS e.max ZirCAD Prime ("Zirconia") with natural looking color shades that are absorbed into the bridge prior to furnace curing and final polishing.

Exemplary Method of Installing a Dental Bridge

Referring to FIGS. 25-28, an exemplary method of installing the dental bridge 200 will now be described. The method is described as installing the dental bridge 200 in a patient's mouth, although for illustrative purposes, in some FIGS. the dental bridge 200 is shown as being installed on a 3D model created by an impression of a patient's mouth. Moreover, it should be appreciated that although the exemplary method is described as having a particular sequence of operations, the sequence may be altered without departing from the scope of the present disclosure. For example, some of the operations depicted may be performed in parallel or in a different sequence that does not materially affect the function of the method. In yet some examples, some of the steps of the method may be omitted. In yet some examples, additional steps not specifically discussed may be included. In other examples, different components of an example device or system may be used to implement the method.

In an initial step, an abutment may be placed inside each of the abutment holes. For instance, in the dental bridge 200 shown and described herein, first, second, third, and fourth abutments may be placed inside corresponding first, second, third, and fourth abutment holes. In the images shown in FIGS. 25 and 26, first and second abutments 240a and 240b are shown already received within corresponding first and second abutment holes 230a and 230b (such as in accordance with steps described below), and a third abutment 240c is shown being placed in a corresponding third abutment hole 230c.

The third abutment 240c is placed inside the corresponding third abutment hole 230c such that the abutment body extends into the through-hole of the abutment hole and the skirt of the abutment abuts rest against or at least somewhat within the gradually widened gingival opening (see FIG. 23). In this manner, the abutment skirt 234 is substantially flush with the gingival side 206 of the bridge 200. A fourth abutment (not shown) may be placed inside a corresponding fourth abutment hole 230d in a similar manner.

Various types of abutments may be used with the dental bridge 200. For instance, one or more of the abutments may be engaging abutments (which generally include a post extending axially from the skirt that is configured to go about 3.5-4 mm down into the body of the implant), and one or more of the abutments may be non-engaging abutments (which include a portion extending from the skirt that may go only about 1 mm down into the body of the implant). An engaging abutment may be used, for instance, if the implant collar is located deeper within the gum. In such an instance, an engaging abutment may be used to help access the implant. In other instances, an engaging implant may be used to help anchor the dental bridge 200 to the patient's jaw. With a portion of the abutment extending down into the implant, the engaging abutment can help define a mechanically strong, rigid connection between the bridge and the implant.

However, engaging abutments can be more difficult to align with the corresponding implant, especially in this instance where both the abutment and the implant extend along the tooth axis TA to accommodate the overall flare of the bridge 200. With the extended portion of the engaging abutment received within the body of the implant, the abutment may be moved laterally relative to the tooth axis TA very little if at all relative to the implant during alignment. In other words, the elongated axial interface between the extended post of the engaging abutment and the implant substantially prevents any lateral movement of the engaging abutment relative to the implant.

In that regard, in an example using four abutments, one engaging abutment may be used with three non-engaging abutments to provide both mechanical strength and flexibility during installation. For instance, the first abutment 240a shown in FIG. 26 may be an engaging abutment, and the second, third, and fourth abutments 240b, 240c, and 240d may be non-engaging abutments. In this manner, the first engaging abutment 240a may enhance the mechanical connection between the bridge and the implant, whereas the non-engaging abutments 240b, 240c, and 204d provide the adjustability needed during installation (e.g., the non-engaging abutments 240b, 240c, and 204d can move sufficiently laterally relative to the tooth axis TA for alignment and threading of the abutment screws into the implants). In another example using four abutments, two engaging abutments are used with two non-engaging abutments. In another example using four abutments, four non-engaging abutments are used. It should be appreciated that in general, a suitable number of engaging and non-engaging abutments are used to ensure sufficient mechanical connection of the bridge to the implants while supporting ease of bridge installation.

In one example, the abutments may be non-platform switching abutments. As is known in the art, platform switching abutments have an implant-engaging portion that is smaller in diameter than the implant platform. In that regard, platform switching abutments may be used in situations to help prevent crestal bone loss and/or to increase the volume of soft tissue surrounding the implant platform, such as with a single tooth replacement. With an abutment having an implant-engaging portion smaller in diameter than the implant platform, gingiva will grow into the space surrounding the smaller diameter portion. Such gingiva growth can compromise the sealing interface between the dental bridge 200 and the gingiva. Accordingly, the inventor has found that non-platform switching abutments, which allow for a substantially smooth transition from the implant to the abutment and which prevent substantial gingiva overgrowth in that area, are generally preferred.

Figure 27:
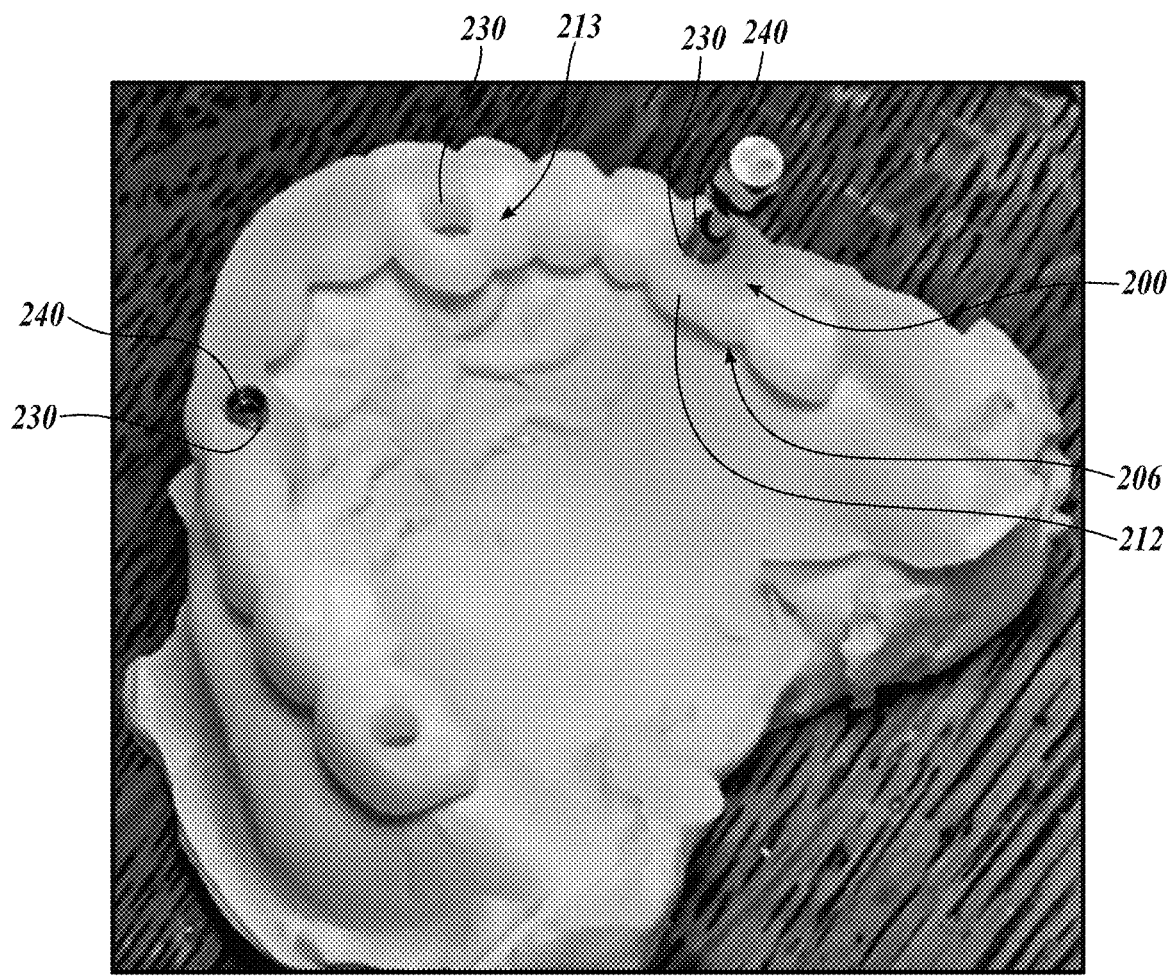

In a next step, generally shown in FIG. 27, the dental bridge 200 may be placed into the patient's mouth. More specifically, the ovate, gingival side 206 of the dental bridge 200 is seated against the correspondingly-shaped bony/gingival ridge of the patient. Once properly seated, abutment screws may be placed into each of the abutments 240 and aligned with the threaded openings in the implants. The abutment screws may then be screwed down into the underlying implants (see a screwdriver being used to align and/or apply torque to a screw received in abutment 240).

Figure 28:
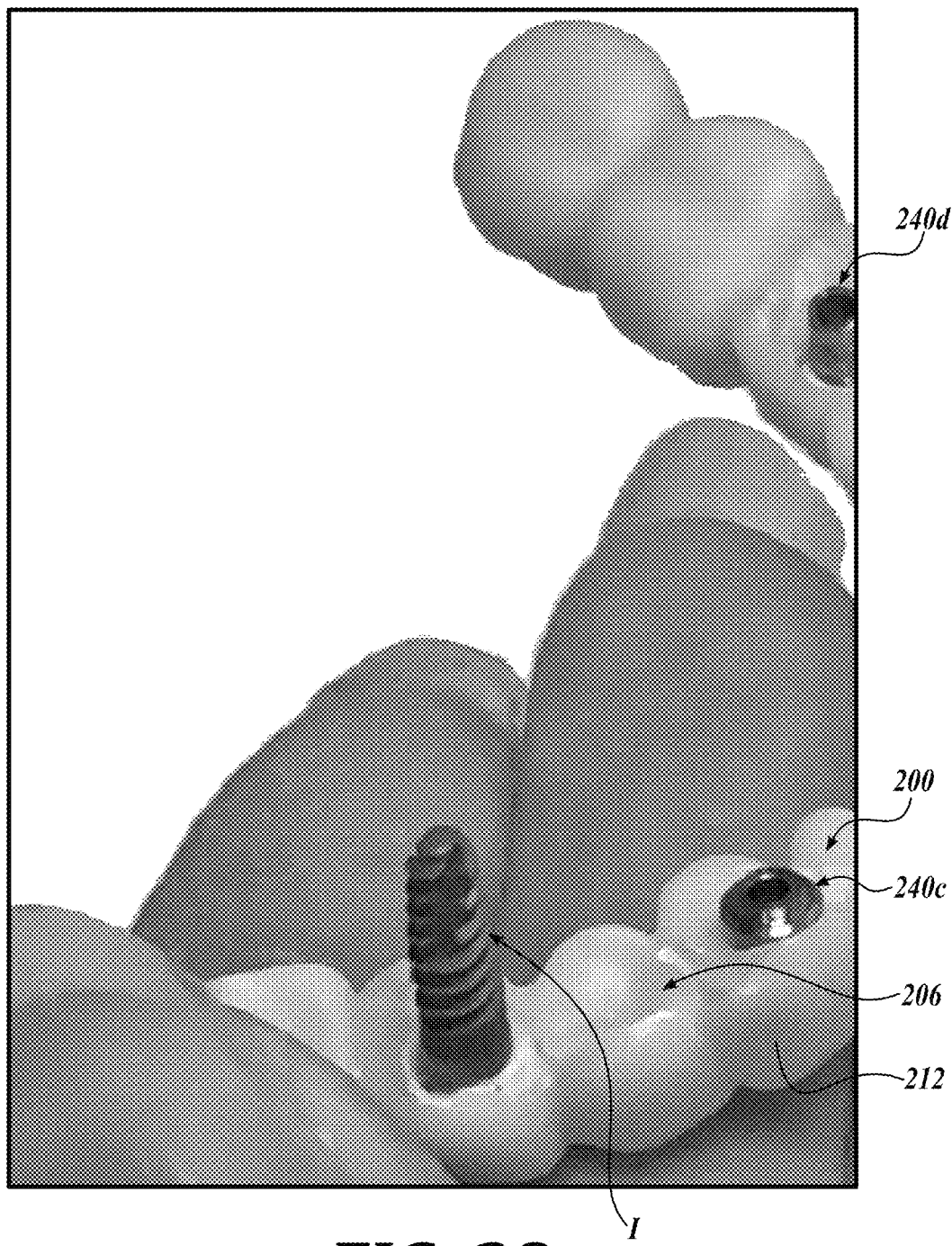

For instance, the abutment screws may be inserted into substantially aligned through-holes of the abutments and the implants, and the screws may be held in position magnetically or otherwise by a small screwdriver. The abutments may then be tightened down into the implants, at least partially, with the abutment screws. If four abutments are used, the first, second, third, and fourth abutments 240 may be screwed into the corresponding implants either in parallel or in series. FIG. 28 shows an implant seated against an abutment secured in an abutment hole of the bridge.

With the bridge 200 seated against the bony/gingival ridge of the patient and with the abutments 240 at least partially secured to the implants, the abutments are generally located within the bridge in the final position. As such, a dental professional can add/clean/cure cement at the base of the dental bridge 200 (on the gingival side) at the intersection of the abutment holes/abutments to secure the abutments within the bridge in their substantially "final" location. Once cured, the abutment screws can be unscrewed, and the dental bridge 200 can be removed from the implants (e.g., it can be disengaged from the bony/gingival ridge). With dental bridge 200 removed, any additional excess cement can be cleaned off the base of the bridge and it can be cured (e.g., light cured) to fully secure the abutments to the bridge at the base. By adding/cleaning/curing/cleaning/curing cement in this manner, any excess cement underneath the dental bridge 200, which would irritate the tissue, is minimized.

The dental bridge 200 may then be put back into the patient's mouth such that the bridge is seated against the bony/gingival ridge of the patient and the abutments engage the implants. Thereafter, all the abutment screws may be inserted into the through-holes of the abutments and implants (either in parallel or in series), and the abutment screws may be fully screwed into the implants with sufficient torque, such as about 15 Ncm. The doctor can then add/clean/cure cement at the top (incisal/occlusal) side of the dental bridge 200 at the intersection of the occlusal/incisal portion of the abutment holes and the abutments after, for instance, adding a layer of cotton balls or pellets into the abutment holes from the occlusal side. The cotton pellets or similar help prevent cement from covering the abutment screw head. As such, the screw heads remain accessible (after drilling through the cement) for any bridge maintenance or cleaning. After the cotton pellets are placed, cement may be added to the abutment holes from the occlusal side and light cured. The cement may be added/cleaned in a manner such that it is substantially flush with the occlusal side of the bridge. The cement may also be substantially tooth colored to match the tooth portion of the bridge.

The dental bridge 200 formed in accordance herein, when installed in the manner described above or in a similar manner, is superiorly hygienic to prior art full mouth dental restoration devices in that there are no undercuts or hidden areas of food entrapment. Rather, the ovate shape of the dental bridge 200 seats against the natural bony/gingival ridge of the patient to seal against the gums in a manner similar to a natural tooth, a single replacement tooth, a partial bridge, a crown, etc. The natural teeth look and feel of the dental bridge 200 allows for easy cleaning of the bridge, both by a toothbrush/floss and by self-cleansing via normal, un-obstructed salivary flow, whereby saliva moves naturally across the bridge removing and flushing away any plaque or food debris.

Exemplary Overview of the Dental Restoration Method

Referring to FIGS. 29A-29F, an exemplary method of performing a full mouth dental restoration will now be described. The method generally includes performing a pre-prosthetic ridge preservation process to prepare a patient's mouth for a full mouth dental restoration, which includes performing atraumatic dental extractions to preserve the original tooth sockets, and then placing socket sized, non-angulated implants into the preserved tooth sockets. The method may further generally include creating and installing a uniquely designed dental bridge on the upper and/or lower jaw that is configured to mate with the preserved tooth sockets and the socket sized, non-angulated implants. The method may be carried out using some or all of the aspects described above with respect to FIGS. 8-28.

It should be appreciated that although the example method is described as having a particular sequence of operations, the sequence may be altered without departing from the scope of the present disclosure. For example, some of the operations depicted may be performed in parallel or in a different sequence that does not materially affect the function of the method. In yet some examples, some of the steps of the method may be omitted. In yet some examples, additional steps not specifically discussed may be included. In other examples, different components of an example device or system may be used to implement the method.

Figure 29A:
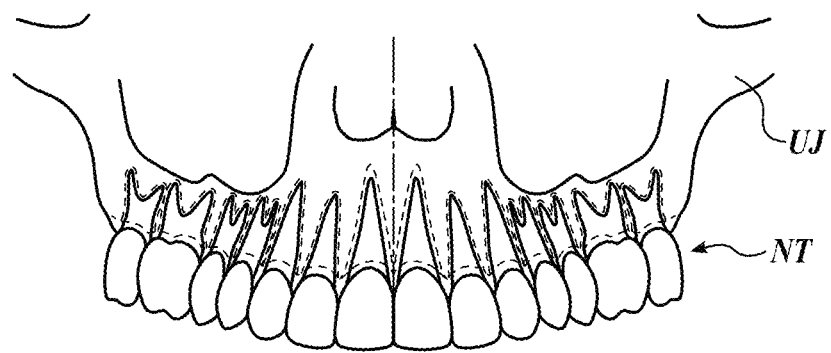
FIG. 29A depicts an upper jaw having a full mouth of teeth, e.g., fourteen teeth.

FIG. 29A depicts an upper jaw UJ having a full mouth of natural teeth NT, e.g., fourteen teeth. In that regard, the method will be described with regards to a dental restoration of all the teeth (e.g., ten, twelve, or fourteen teeth) of an upper jaw, although it should be appreciated that a similar method may be used for the lower jaw.

In a first step, a patient may be evaluated and selected as a candidate for a full mouth, upper jaw dental restoration, such as using information gathered from a physical exam, a CBCT scan, etc. Aspects of the evaluation may include reviewing any pathologies of the teeth NT or other aspects of the teeth that may require special attention during atraumatic extraction (e.g., a hooked root tip), as discussed above.

Figure 29B:
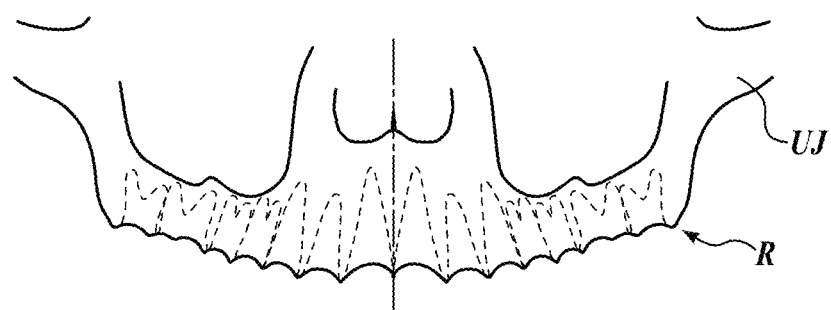
FIG. 29B depicts an upper jaw having a full mouth of teeth, e.g., fourteen teeth, atraumatically extracted with the tooth sockets preserved in accordance with exemplary aspects of the pre-prosthetic ridge preservation process of FIG. 9.

In a next step, as shown in FIG. 29B, all of the teeth NT are extracted atraumatically using the techniques described herein, or similar techniques. In effect, the teeth are extracted atraumatically such that the alveolar bone surrounding each tooth socket S is preserved substantially in its entirety, along with the keratinized gingiva that defines the naturally shaped gingival ridge R. Further, apical pressure may be applied during extraction to condense the apical part of the alveolar bone, providing the foundation for bi-cortical anchorage of the implant.

Figure 29C:
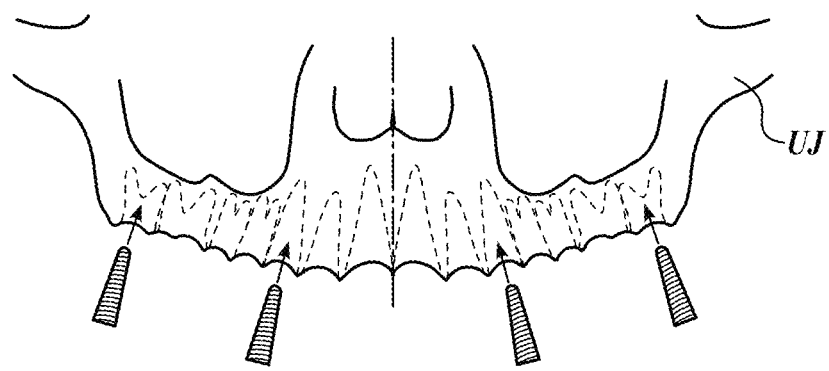
FIG. 29C depicts implants being placed in tooth sockets of the upper jaw of FIG. 29B.
Figure 29D:
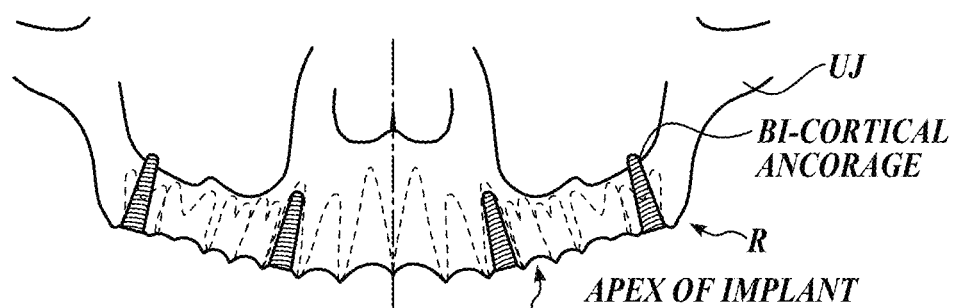
FIG. 29D depicts implants placed in tooth sockets of the upper jaw of FIG. 29B.

In that regard, in next steps, as shown in FIGS. 29C and 29D, socket sized, non-angulated implants I are placed into preserved tooth sockets S, as discussed above. For instance, the implants may be placed in sockets for former teeth #3 (upper right first molar), #6 (upper right canine), #11 (upper left canine), and #14 (upper left first molar), unless there is insufficient bone in which case the implant can be moved one tooth socket or an additional implant can be placed in a nearby socket.

The implants may be placed into the former tooth sockets (root sockets) either free handed or with the aid of a surgical guide. Generally, each of the implants I is placed into a corresponding socket S such that a longitudinal axis of the implant is substantially coaxially aligned with a longitudinal axis of the corresponding tooth socket S (defined by the original tooth having a tooth axis TA), as shown in FIGS. 16A-17C. As noted above, the condensed apical part of the alveolar bone (see, e.g., condensed bone CB shown in FIG. 16A), which is hard and thick, can be used for bi-cortical anchorage of the implant, as shown for implant 110a in FIG. 16A. Moreover, the implant may be placed such that the threads of the implant are generally located in the bone, and the collar of the implant is generally disposed above the bone (such as at least partially in the gingival layer), as shown in FIGS. 17A-17C.

Figure 29E:
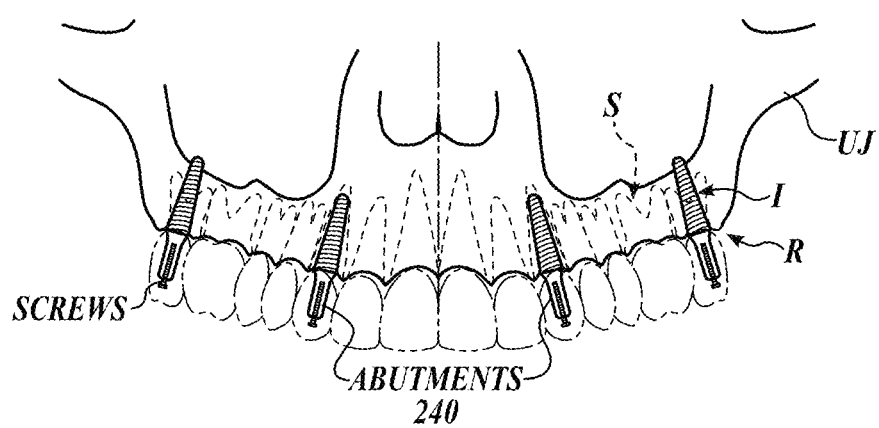
FIG. 29E depicts a dental bridge formed in accordance with exemplary aspects of the present disclosure being secured to the implants of the upper jaw of FIG. 29D, wherein abutments received within the dental bridge are being secured to implants.
Figure 29F:
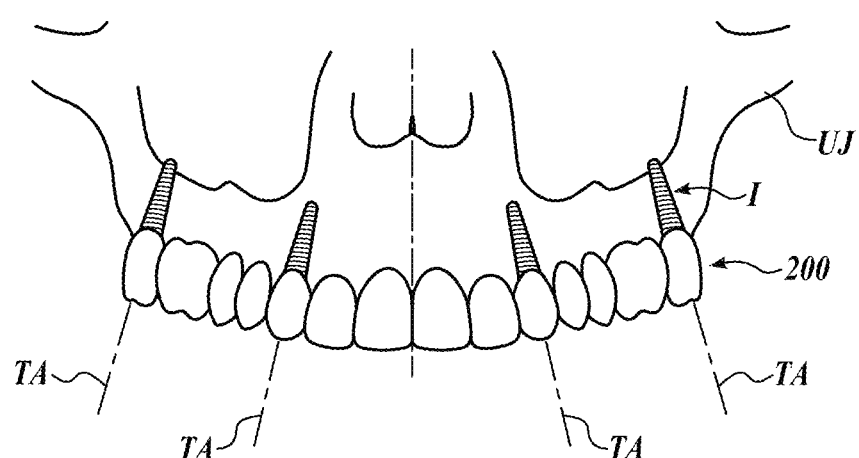
FIG. 29F depicts a dental bridge formed in accordance with exemplary aspects of the present disclosure secured to the implants of the upper jaw of FIG. 29D.

In a next step, as shown in FIG. 29E, the abutments 240 may be located within the abutment holes 230 of the dental bridge 200, and abutment screws may be used to at least partially secure the abutments to the implants I. The abutments 240 may then be at least partially secured to the gingival side of the bridge 200 with cement or the like, and the bridge may be removed (by unscrewing the screws) for cleaning and fully securing the abutments to the bridge at the gingival base. The dental bridge 200 may then be put back into the patient's mouth and the abutment screws may be fully screwed into the implants with sufficient torque, substantially completing the dental restoration process, as shown in FIG. 29F.

Numerous specific details are described to provide a thorough understanding of the disclosure. However, in certain instances, well-known or conventional details are not described in order to avoid obscuring the description. Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims or can be learned by the practice of the principles set forth herein.

While the concepts of the present disclosure are susceptible to various modifications and alternative forms, specific examples thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

Although the example method is described as having a particular sequence of operations, the sequence may be altered without departing from the scope of the present disclosure. For example, some of the operations depicted may be performed in parallel or in a different sequence that does not materially affect the function of the method. In yet some examples, some of the steps of the method may be omitted. In other examples, different components of an example device or system may be used to implement the method.

References in the specification to "one example," "an example," "an illustrative example," etc., indicate that the example described may include a particular feature, structure, or characteristic, but every example may or may not necessarily include that particular feature, structure, or characteristic. Moreover, such phrases are not necessarily referring to the same example. Further, when a particular feature, structure, or characteristic is described in connection with an example, it is submitted that it is within the knowledge of one skilled in the art to affect such feature, structure, or characteristic in connection with other examples whether or not explicitly described.

As used herein, the terms "about" and "approximately," in reference to a number, is used herein to include numbers that fall within a range of 10%, 5%, or 1% in either direction (greater than or less than) the number unless otherwise stated or otherwise evident from the context (except where such number would exceed 100% of a possible value).

Language such as "top", "bottom", "upper", "lower", "vertical", "horizontal", "lateral", etc., in the present disclosure is meant to provide orientation for the reader with reference to the drawings and is not intended to be the required orientation of the components or to impart orientation limitations into the claims.

In the drawings, some structural or method features may be shown in specific arrangements and/or orderings. However, it should be appreciated that such specific arrangements and/or orderings may not be required. Rather, in some examples, such features may be arranged in a different manner and/or order than shown in the illustrative figures. Additionally, the inclusion of a structural or method feature in a particular figure is not meant to imply that such feature is required in all examples and, in some examples, it may not be included or may be combined with other features.

The terms used in this specification generally have their ordinary meanings in the art, within the context of the disclosure, and in the specific context where each term is used. Alternative language and synonyms may be used for any one or more of the terms discussed herein, and no special significance should be placed upon whether or not a term is elaborated or discussed herein. In some cases, synonyms for certain terms are provided. A recital of one or more synonyms does not exclude the use of other synonyms. The use of examples anywhere in this specification including examples of any terms discussed herein is illustrative only and is not intended to further limit the scope and meaning of the disclosure or of any example term.

Likewise, the disclosure is not limited to various example examples given in this specification. Unless otherwise defined, technical and scientific terms used herein have the meaning as commonly understood by one of ordinary skill in the art to which this disclosure pertains. In the case of conflict, the present document, including definitions will control.

Note that titles or subtitles may be used in the disclosure for convenience of a reader, which in no way should limit the scope of the disclosure.

While illustrative examples have been illustrated and described, it will be appreciated that various changes can be made therein without departing from the spirit and scope of the invention.

The examples of the invention in which an exclusive property or privilege is claimed are defined as follows:

1. A process for replacing an entire arch of a patient's jaw with a coronal-only full arch dental restoration device, the process comprising:
    extracting all teeth in a patient's arch to define fourteen post-extraction root sockets, wherein each tooth is extracted in a manner that substantially maintains the patient's original alveolar bone and original keratinized gingiva, thereby defining a bony/gingival ridge along the arch; and
    installing first, second, third, and fourth socket-sized, straight implants into first, second, third, and fourth post-extraction root sockets such that a longitudinal axis of each of the socket-sized implants is substantially coaxially aligned with a longitudinal axis of a corresponding post-extraction root socket and such that a threaded body of each of the socket-sized implants is located within bone of the corresponding post-extraction root socket, and a collar of each of the socket-sized implants is located generally above an outer cortex layer of the bone at least partially in a gingiva layer of the corresponding post-extraction socket, the collar substantially cylindrical in shape, each socket-sized, straight implant having a threaded opening for receiving an abutment screw with a thread axis extending substantially along the implant axis, the first, second, third, and fourth post-extraction root sockets located between post-extraction root sockets without an implant;

providing the coronal-only full arch dental restoration device, comprising:

a body extending between a gingival side and an occlusal/incisal side, wherein the body includes a plurality of integrally formed teeth portions, each tooth portion of the plurality of integrally formed teeth portions having a tooth axis extending buccally/labially between the gingival side and the occlusal/incisal side, each tooth portion of the plurality of integrally formed teeth portions further having a middle section, a gingival section extending from the middle section to the gingival side of the body, and an occlusal/incisal section extending from the middle section to the occlusal/incisal side of the body, the plurality of integrally formed teeth portions including:

first, second, third, and fourth abutment-receiving teeth portions having first, second, third, and fourth abutment holes, respectively, each abutment hole extending entirely through the corresponding tooth portion from the gingival side to the occlusal/incisal side of the body to define a gingival opening and an incisal/occlusal opening, respectively, each abutment hole including a longitudinal axis that is substantially coaxially aligned with the tooth axis of the corresponding tooth portion and the longitudinal axis of the corresponding post-extraction root socket;

first and second non-abutment-receiving teeth portions located adjacent to the first abutment-receiving tooth portion, third and fourth non-abutment-receiving teeth portions located adjacent to the second abutment-receiving tooth portion, fifth and sixth non-abutment-receiving teeth portions located adjacent to the third abutment-receiving tooth portion, and seventh and eighth non-abutment-receiving teeth portions located adjacent to the fourth abutment-receiving tooth portion;

an ovate pontic portion defined on each tooth portion on the gingival side of the body, the ovate pontic portion of each tooth portion substantially conforming in shape to the corresponding post-extraction root socket defined by the keratinized gingiva covered interdental and interseptal bone of the patient after a tooth is extracted, wherein the ovate pontic portion defined on each non-abutment-receiving tooth portion of the plurality of integrally formed teeth portions extends continuously between lingual/palatal, distal, mesial, and buccal/labial portions of the body sidewall to define an ovate pontic portion surface having an ovate pontic contour that extends across the entire gingival side of the body, and wherein the ovate pontic portion defined on each abutment-receiving tooth portion of the plurality of integrally formed teeth portions extends continuously around the corresponding gingival opening and intersects the lingual/palatal, distal, mesial, and buccal/labial portions of the body sidewall, and wherein the ovate pontic portion defined on each tooth portion is sealable against the keratinized gingiva covered first, second, third, and fourth socket walls of a corresponding post-extraction root socket when the ovate pontic portion is engaged with the corresponding post-extraction tooth socket; and placing first, second, third, and fourth abutments within the first, second, third, and fourth abutment holes, respectively, such that a longitudinal axis of each of the first, second, third, and fourth abutments is substantially aligned with the longitudinal axis of the corresponding first, second, third, and fourth abutment holes;

seating the body of the dental restoration device against the bony/gingival ridge such that the ovate pontic portions of each tooth portion engage the corresponding post-extraction root socket;

passing an abutment screw through each abutment; and threadably securing the abutment screws within the threaded openings of the corresponding straight implants.

2. The process of claim 1, further comprising at least one of adding, cleaning, and curing cement on the gingival side of the body generally at an intersection of the abutment holes and the corresponding abutments to secure the abutments within the body before threadably securing the abutment screws within the threaded openings of the corresponding straight implants.

3. The method of claim 1, further comprising using at least one of:
one engaging abutment and three non-engaging abutments; and
non-platform switching abutments.

4. The method of claim 1, further comprising:
applying apical pressure to each tooth during atraumatic extraction to define condensed bone at an apical root tip of the corresponding post-extraction root socket; and
engaging an apex of each of the straight implants into the condensed bone of the corresponding post-extraction root socket to substantially achieve bi-cortical anchorage of the implant within the post-extraction root socket.

5. The method of claim 1, further comprising at least one of applying apical pressure and lateral pressure to a tooth in its socket to expand the root socket in the alveolar bone during extraction.

6. The method of claim 5, further comprising pulling upwardly on the tooth at least one of in isolation or when moving the tooth laterally in its socket after at least one of apical pressure and lateral pressure is applied.

7. The method of claim 5, further comprising at least one of moving each tooth in a "figure of eight" pattern and moving each tooth bucco-lingually to further expand the socket in the alveolar bone during extraction.

8. The method of claim 5, further comprising elevating a gingival cuff surrounding each tooth before applying pressure to the tooth.

9. The method of claim 1, further comprising extracting each tooth to substantially maintain a full height and width of the patient's bony/gingival ridge and interdental and interseptal bone covered by the patient's substantially original keratinized gingiva to define interdental papilla.

10. The method of claim 1, further comprising placing each of the socket-sized implants such that the threaded body of each of the socket-sized implants is located within newly ossifying bone of the corresponding post-extraction root socket, and the collar of each of the socket-sized implants is located generally above the newly ossifying bone of the corresponding post-extraction socket.

11. The method of claim 10, wherein each post-extraction root socket has a longitudinal axis that is within about 1-20 degrees offset from vertical.

12. The method of claim 1, further comprising securing an apex of each of the socket-sized implants within a maxillary posterior region involving a bony floor of a sinus cavity to substantially achieve bi-cortical anchorage of each of the socket-sized implants within a corresponding post-extraction root socket when the process is performed for an arch of an upper jaw.

13. The method of claim 1, further comprising leaving a substantially disease-free root tip of an extracted tooth in a post-extraction root socket if the tooth breaks during extraction.

14. The method of claim 1, further comprising engaging the collar of each socket-sized implant with an abutment skirt of a non-engaging abutment.

15. The method of claim 1, further comprising determining, with a computing device, the longitudinal axis of each of the post-extraction root sockets.

\* \* \* \* \*